(12) United States Patent
Hayashi

(10) Patent No.: US 8,933,374 B2
(45) Date of Patent: Jan. 13, 2015

(54) PULSE LASER MACHINING APPARATUS AND PULSE LASER MACHINING METHOD

(75) Inventor: Makoto Hayashi, Kanagawa (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 219 days.

(21) Appl. No.: 13/388,508

(22) PCT Filed: Jun. 24, 2010

(86) PCT No.: PCT/JP2010/004197
§ 371 (c)(1),
(2), (4) Date: Apr. 16, 2012

(87) PCT Pub. No.: WO2011/016176
PCT Pub. Date: Feb. 10, 2011

(65) Prior Publication Data
US 2012/0187103 A1 Jul. 26, 2012

(30) Foreign Application Priority Data
Aug. 3, 2009 (JP) .................................. 2009-180285

(51) Int. Cl.
*H05B 7/18* (2006.01)
*B23K 26/00* (2014.01)
(Continued)

(52) U.S. Cl.
CPC ............. *B23K 26/03* (2013.01); *B23K 26/0635* (2013.01); *B23K 26/0807* (2013.01); *B23K 26/0853* (2013.01); *G02B 26/105* (2013.01)
USPC .................... 219/383; 219/121.6; 219/121.61; 219/121.65; 219/121.66; 219/121.67; 219/121.69; 219/121.73; 219/121.76; 219/121.78; 219/121.8; 219/121.81; 219/121.82; 219/121.83; 219/121.85

(58) Field of Classification Search
CPC ............... B23K 26/03; B23K 26/0635; B23K 26/0853; B23K 26/0807; B23K 26/041; B23K 26/063; B23K 2203/00; G02B 26/105; H01S 3/0007

USPC .............. 219/121.6, 121.61, 121.65, 121.66, 219/121.67, 121.69, 121.73, 121.76, 219/121.78, 121.8, 121.81, 121.82, 121.83, 219/121.85
See application file for complete search history.

(56) References Cited

U.S. PATENT DOCUMENTS 3,636,251 A * 1/1972 Daly et al. .................... 358/3.31
4,959,275 A * 9/1990 Iguchi et al. .................. 428/603
(Continued)

FOREIGN PATENT DOCUMENTS

JP 2001-042246 2/2001
JP 2002-160086 6/2002
(Continued)

OTHER PUBLICATIONS

International Search Report of PCT/JP2010/004197, mailed Sep. 21, 2010.
(Continued)

*Primary Examiner* — Dana Ross
*Assistant Examiner* — Gyounghyun Bae
(74) *Attorney, Agent, or Firm* — DLA Piper LLP (US)

(57) ABSTRACT

A pulse laser machining apparatus and method generates a clock signal, emits a pulse laser beam in synchronization with the clock signal, scans the pulse laser beam in synchronization with the clock signal only in a one-dimensional direction, moves a stage in a direction perpendicular to the one-dimensional direction, passes or cuts off the pulse laser beam in synchronization with the clock signal, and controls the passing or cutting off of the pulse laser beam based on the number of light pulses of the pulse laser beam.

7 Claims, 12 Drawing Sheets

(51) Int. Cl.
*B23K 26/14* (2014.01)
*B23K 26/16* (2006.01)
*B23K 26/06* (2014.01)
*B23K 26/02* (2014.01)
*B23K 26/10* (2006.01)
*B23K 26/08* (2014.01)
*B23K 26/03* (2006.01)
*G02B 26/10* (2006.01)

(56) References Cited

U.S. PATENT DOCUMENTS

| | | | |
|---|---|---|---|
| 5,670,067 A * | 9/1997 | Koide et al. | 219/121.68 |
| 5,751,585 A * | 5/1998 | Cutler et al. | 700/161 |
| 5,751,588 A * | 5/1998 | Freedenberg et al. | 700/186 |
| 6,172,325 B1 * | 1/2001 | Baird et al. | 219/121.62 |
| 6,972,392 B2 * | 12/2005 | Kurosawa et al. | 219/121.72 |
| 7,050,882 B1 * | 5/2006 | Indou et al. | 700/166 |
| 7,133,187 B2 * | 11/2006 | Johnson | 359/311 |
| 7,324,861 B1 * | 1/2008 | Zheng et al. | 700/97 |
| 7,462,802 B2 * | 12/2008 | Hiramatsu | 219/121.71 |
| 7,569,794 B2 * | 8/2009 | Faour et al. | 219/121.68 |
| 7,723,639 B2 * | 5/2010 | Ellin et al. | 219/121.61 |
| 7,767,930 B2 * | 8/2010 | Wilbanks et al. | 219/121.71 |
| 8,026,158 B2 * | 9/2011 | Bruland et al. | 438/487 |
| 2001/0045419 A1 * | 11/2001 | Dunsky et al. | 219/121.76 |
| 2001/0045974 A1 | 11/2001 | Shoemaker | |
| 2003/0042230 A1 * | 3/2003 | Gross et al. | 219/121.7 |
| 2003/0222324 A1 * | 12/2003 | Sun et al. | 257/431 |
| 2004/0069751 A1 * | 4/2004 | Yamazaki et al. | 219/121.6 |
| 2006/0028655 A1 * | 2/2006 | Cordingley et al. | 356/614 |
| 2006/0102601 A1 * | 5/2006 | Shirk et al. | 219/121.68 |
| 2007/0075063 A1 * | 4/2007 | Wilbanks et al. | 219/121.85 |
| 2008/0093349 A1 * | 4/2008 | Bruland et al. | 219/121.69 |
| 2009/0242522 A1 * | 10/2009 | Baird et al. | 219/121.61 |
| 2009/0242531 A1 * | 10/2009 | Baird et al. | 219/121.81 |
| 2012/0187103 A1 * | 7/2012 | Hayashi | 219/383 |

FOREIGN PATENT DOCUMENTS

| | | |
|---|---|---|
| JP | 2002-530204 | 9/2002 |
| JP | 2002-536188 A | 10/2002 |
| JP | 2005-118814 | 5/2005 |
| JP | 2005-118821 | 5/2005 |

OTHER PUBLICATIONS

English translation of the International Search Report of PCT/JP2010/004197, mailed Sep. 21, 2010.
Written Opinion of PCT/JP2010/004197, mailed Sep. 21, 2010.
English translation of the Written Opinion of PCT/JP2010/004197, mailed Sep. 21, 2010.
English abstract for JP 2005-118821, Published May 12, 2005.
English abstract for JP 2005-118814, Published May 12, 2005.
English abstract of JP 2002-536188 A, Published Oct. 29, 2002.
English abstract of JP 2002-160086, Published Jun. 4, 2002.
English abstract of JP 2001-042246, Published Feb. 16, 2001.
English abstract of JP 2002-530204 Published Sep. 17, 2002.

* cited by examiner

PULSE LASER MACHINING APPARATUS AND PULSE LASER MACHINING METHOD

CROSS-REFERENCE TO RELATED APPLICATIONS

This application is a National Stage of International Application No. PCT/JP2010/004197 (not published in English), filed Jun. 24, 2010, which, in turn, claims the benefit of Japanese Patent Application No. 2009-180285, filed Aug. 3, 2009. The entire contents of these applications are herein incorporated by reference in their entirety.

TECHNICAL FIELD

The present invention relates to a pulse laser machining apparatus and a pulse laser machining method for machining a surface of an object to be machined with a pulse laser beam.

BACKGROUND ART

In recent years, for example, as the sizes of flat panel displays (FPDs) such as liquid crystal panels increase, the flat panel displays require members having large areas thereof on which high-precision micromachining process is performed in the order of μm or less. Further, micromachining of a large role mold for making a sheet, a mold having a fine shape for a deep micro, lens and a flat-end groove, difficult-to-machine materials or the like, which are difficult to make by conventional machining processes, is now considered in various manners.

On the other hand, for example, it is known to be able to easily form a micro pattern of 1 μm or less on a surface of metal by abrasion machining using an ultra-short pulse laser beam whose pulse width is in the order of picosecond (ps) or less. Heretofore, various methods have been presented with regard to a technique for machining a surface of an object made of polymeric materials including resin, semiconductor material, glass material, metal material, and the like, by this ultra-short pulse laser machining (for example, see Patent Literature 1).

In the laser machining disclosed in Patent Literature 1, it is necessary to move and scan the object placed on a stage in a wide range in two-dimensional directions, i.e., XY directions. However, in this case, the machining speed is limited by the speed of movement of the stage, and it is difficult to increase the speed.

In the laser machining, there is a technique for micromachining a desired region by scanning the region two-dimensionally in XY directions with a laser beam, using a beam scanner such as Galvanometer scanner (for example, see Patent Literature 2). With the Galvanometer scanner, the scanning speed can be improved as compared with the use of the stage. However, in the techniques available today, the accuracy of positioning of the irradiation spot is 10 μm or more in the two-dimensional scanning of the pulse laser beam in this case, and it is difficult to apply this technique to the micromachining by abrasion process using the pulse laser beam.

CITATION LIST

Patent Literature

[Patent Literature 1] JP-A 2005-118821
[Patent Literature 2] JP-A 2002-160086

SUMMARY OF INVENTION

Technical Problem

The present invention has been made in view of the above circumstances, and a purpose of the present invention is to provide a pulse laser machining apparatus and a pulse laser machining method that can improve the accuracy of positioning of an irradiation spot of a pulse laser beam, perform stable micromachining on a surface of a large object to be machined, and increase the speed of the micromachining.

Solution to Problem

A pulse laser machining apparatus according to an aspect of the present invention includes a reference clock oscillating circuit for generating a clock signal, a laser oscillator for emitting a pulse laser beam in synchronization with the clock signal, a laser beam scanner for scanning the pulse laser beam in synchronization with the clock signal only in one-dimensional direction, a stage capable of holding an object to be machined thereon and moving in a direction perpendicular to the one-dimensional direction, a pulse picker provided in an optical path between the laser oscillator and the laser beam scanner to switch pass/cutoff of the pulse laser beam in synchronization with the clock signal, and a pulse picker control unit for controlling the pulse picker on the basis of the number of light pulses of the pulse laser beam.

The apparatus according to the above aspect desirably includes a table generation unit for generating a machining table describing input machining data of the object to be machined as the number of light pulses of the pulse laser beam, wherein the pulse picker control unit desirably controls the pulse picker on the basis of the machining table.

In the apparatus according to the above aspect, the table generation unit desirably generates the machining table on the basis of a machining length and a non-machining length of the machining data and on the basis of a spot diameter of the pulse laser beam.

In the apparatus according to the above aspect, the scan of the pulse laser beam in the one-dimensional direction with the laser beam scanner and the move of the stage in the direction perpendicular to the one-dimensional direction subsequent to the scan are desirably alternately repeated, whereby the object to be machined is desirably machined.

In the apparatus according to the above aspect, the laser beam scanner is desirably constituted by a Galvanometer scanner, and the pulse picker is desirably constituted by an acousto-optic modulator (AOM) or an electro-optic modulator (EOM).

The apparatus according to the above aspect desirably includes a correction mechanism for correcting a machining origin point position for each scan on the basis of a scan position signal given by the laser beam scanner, and the correction mechanism desirably controls pass/cutoff of the pulse laser beam in the pulse picker on the basis of the scan position signal.

In the apparatus according to the above aspect, movement of the stage is desirably controlled in the direction perpendicular to the one-dimensional direction on the basis of a scan position signal of the laser beam scanner.

A pulse laser machining method according to another aspect of the present invention includes mounting an object to be machined on a stage, generating a clock signal, emitting a pulse laser beam in synchronization with the clock signal, scanning the pulse laser beam onto a surface of the object to be machined in synchronization with the clock signal in one-dimensional direction, moving the stage in a direction perpendicular to the one-dimensional direction after scanning the pulse laser beam in the one-dimensional direction, and further scanning the pulse laser beam in the one-dimensional direction in synchronization with the clock signal, wherein when the pulse laser beam is scanned in the one-dimensional direction, irradiation/non-irradiation of the pulse laser beam is switched in synchronization with the clock signal on the basis of the number of light pulses of the pulse laser beam.

Advantageous Effects of Invention

According to the present invention, a pulse laser machining apparatus and a pulse laser machining method that can improve the accuracy of positioning of an irradiation spot of a pulse laser beam, perform stable micromachining on a surface of a large object to be machined, and increase the speed of the micromachining are provided.

DESCRIPTION OF EMBODIMENTS

A pulse laser machining apparatus and a pulse laser machining method according to an embodiment of the present invention will be hereinafter explained with reference to drawings.

First Embodiment

A pulse laser machining apparatus according to the present embodiment includes a reference clock oscillating circuit for generating a clock signal, a laser oscillator for emitting a pulse laser beam in synchronization with the clock signal, a laser beam scanner for scanning the pulse laser beam in synchronization with the clock signal only in one-dimensional direction, a stage capable of holding an object to be machined (workpiece) thereon and moving in a direction perpendicular to the one-dimensional direction, a pulse picker provided in an optical path between the laser oscillator and the laser beam scanner to switch pass/cutoff of the pulse laser beam in synchronization with the clock signal, and a pulse picker control unit for controlling the pulse picker on the basis of the number of light pulses of the pulse laser beam.

In a pulse laser machining apparatus according to the present embodiment, a pulse of the laser oscillator, a scan of the laser beam scanner, and pass/cutoff of the pulse laser beam are directly or indirectly synchronized with the same clock signal. As described above, the accuracy of positioning of the irradiation spot of the pulse laser beam is improved by maintaining synchronization between the laser system and the beam scan system.

Further, pass/cutoff of the pulse laser beam can be controlled on the basis of the number of light pulses of the pulse laser beam. This allows easily maintaining synchronization between a pulse of the laser oscillator, a scan of the laser beam scanner, and pass/cutoff of the pulse laser beam. In addition, the configuration of the control circuit can be simplified. The pulse laser machining apparatus according to the present embodiment further improves the accuracy of positioning of the irradiation spot of the pulse laser beam, wherein stable micromachining can be performed on a surface of a large object to be machined, and the increase of the speed thereof is easily achieved.

Figure 1:
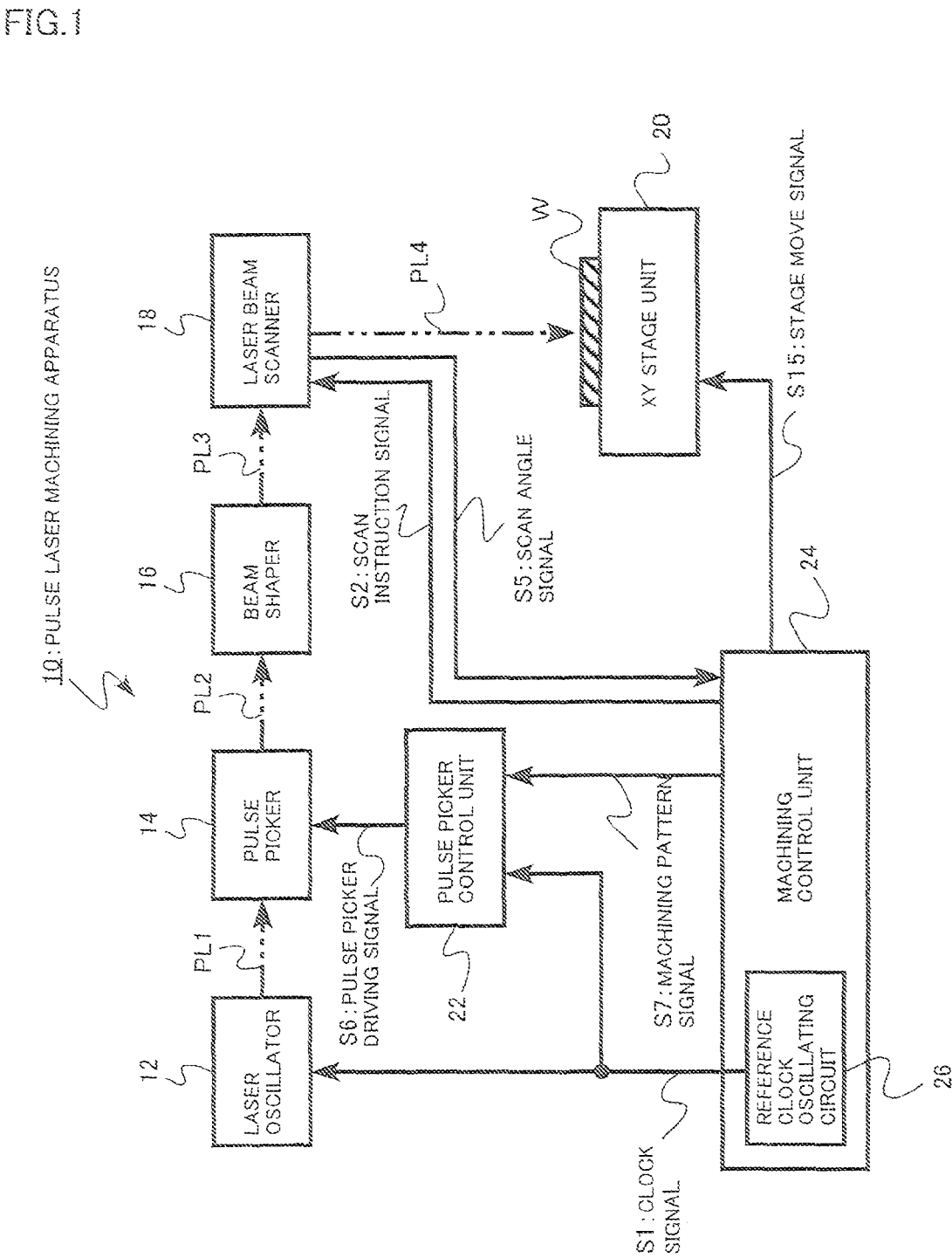
FIG. 1 is a configuration diagram illustrating a pulse laser machining apparatus according to a first embodiment.

FIG. 1 is a configuration diagram illustrating a pulse laser machining apparatus according to the present embodiment. A pulse laser machining apparatus 10 includes, as its main configuration, a laser oscillator 12, a pulse picker 14, a beam shaper 16, a laser beam scanner 18, an XY stage unit 20, a pulse picker control unit 22, and a machining control unit 24. The machining control unit 24 has a reference clock oscillating circuit 26 generating a desired clock signal S1.

The laser oscillator 12 is configured to emit a pulse laser beam PL1 in synchronization with the clock signal S1 generated by the reference clock oscillating circuit 26. This laser oscillator 12 desirably oscillates ps (picosecond) laser beam or fs (femtosecond) laser beam, i.e., ultra-short pulse.

In this case, the laser wavelength emitted by the laser oscillator 12 is selected in view of light absorption rate, light reflection rate, and the like of the object to be machined. For example, in a case where an object to be machined is diamond-like carbon (DLC) or metal material including Cu, Ni, SKD11 and the like, i.e., difficult-to-machine material, it is desirable to use the second harmonic of Nd:YAG laser (wavelength: 532 nm).

The pulse picker 14 is provided on an optical path between the laser oscillator 12 and the laser beam scanner 18. Further, whether the object to be machined (workpiece W) is machined/not machined is switched by switching between pass/cutoff (ON/OFF) of the pulse laser beam PL1 in synchronization with the clock signal S1. As described above, with the operation of the pulse picker 14, ON/OFF of the pulse laser beam PL1 is controlled to machine the object, so that it is made into a modulated pulse laser beam PL2.

The pulse picker 14 is desirably made with, for example, an acousto-optic modulator (AOM). Alternatively, for example, a Raman diffraction electro-optic modulator (EOM) may be used.

The beam shaper 16 makes the incident pulse laser beam PL2 into a pulse laser beam PL3 shaped in a desired shape.

For example, it is a beam expander for enlarging a beam diameter with a constant magnification. For example, an optical device such as a homogenizer for uniformizing light intensity distribution of a cross section of a beam may be provided. For example, a device for making the cross section of the beam in a circular shape and an optical device for making the beam into circularly-polarized light may be provided.

The laser beam scanner 18 is configured to scan a pulse laser beam PL4 only in one-dimensional direction in synchronization with the clock signal S1. As described above, the accuracy of positioning of the irradiation spot of the pulse laser beam can be improved by scanning the pulse laser beam PL4 in synchronization with the clock signal S1.

Alternatively, the accuracy of positioning of the irradiation spot of the pulse laser beam can also be improved by scanning only in one-dimensional direction. This is because the accuracy of positioning of the beam in the laser beam scanner scanning in two-dimensional directions is inferior to the accuracy of positioning of the beam in the laser beam scanner scanning only in one-dimensional direction due to the structure.

Figure 2:
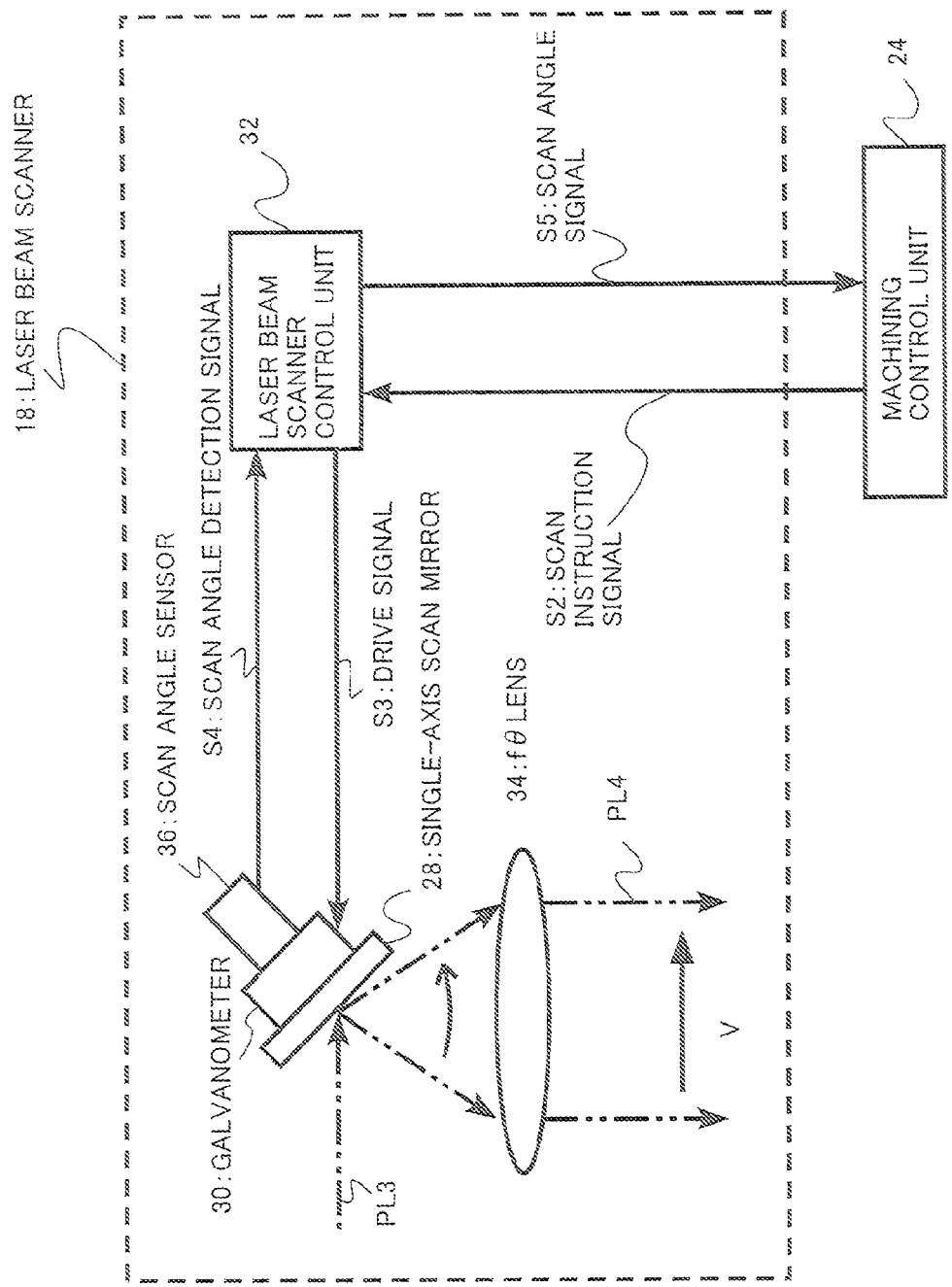
FIG. 2 is an explanatory diagram illustrating a laser beam scanner of the pulse laser machining apparatus according to the first embodiment.

The laser beam scanner 18 may be, for example, a Galvanometer scanner having a single-axis scan mirror. FIG. 2 is an explanatory diagram illustrating a laser beam scanner using Galvanometer scanner.

The Galvanometer scanner includes a single-axis scan mirror 28, a Galvanometer 30, and a laser beam scanner control unit 32. In this case, the Galvanometer 30 includes, for example, a drive mechanism of scan mirror rotation such as servo control with feedback given by a scan angle sensor 36.

The machining control unit 24 transmits a scan instruction signal S2 in synchronization with the clock signal S1. The Galvanometer 30 is configured to be driven and controlled by a drive signal S3 given by the laser beam scanner control unit 32 on the basis of the scan instruction signal S2. The Galvanometer scanner scans the pulse laser beam PL3 totally reflected by the single-axis scan mirror 28 according to rotation motion (oscillation) of the scan mirror as shown by an arrow in FIG. 2.

The laser beam scanner 18 has the scan angle sensor 36. In the case of the Galvanometer scanner, a structure for detecting the rotational position of the single-axis scan mirror 28 using a rotary encoder and the like is provided. The scan angle sensor 36 transmits a detected scan angle detection signal S4 to the laser beam scanner control unit 32 to be used for driving and controlling the Galvanometer 30. The laser beam scanner control unit 32 transmits a scan angle signal S5, i.e., a scan position signal, to the machining control unit 24 on the basis of the scan angle detection signal S4.

The pulse laser beam PL3 reflected by the single-axis scan mirror 28 passes through an fθ lens 34, and becomes a pulse laser beam PL4 of an image height H=fθ scanned with, for example, a constant speed V in parallel in one-dimensional direction. The pulse laser beam PL4 is projected upon a workpiece W as an irradiation pulse light with which the surface of the workpiece W held on the XY stage unit 20 is micromachined.

Not only the Galvanometer scanner but also, for example, a polygon scanner, a piezo scanner, a resonant scanner, or the like may be applied to the laser beam scanner 18.

Figure 3:
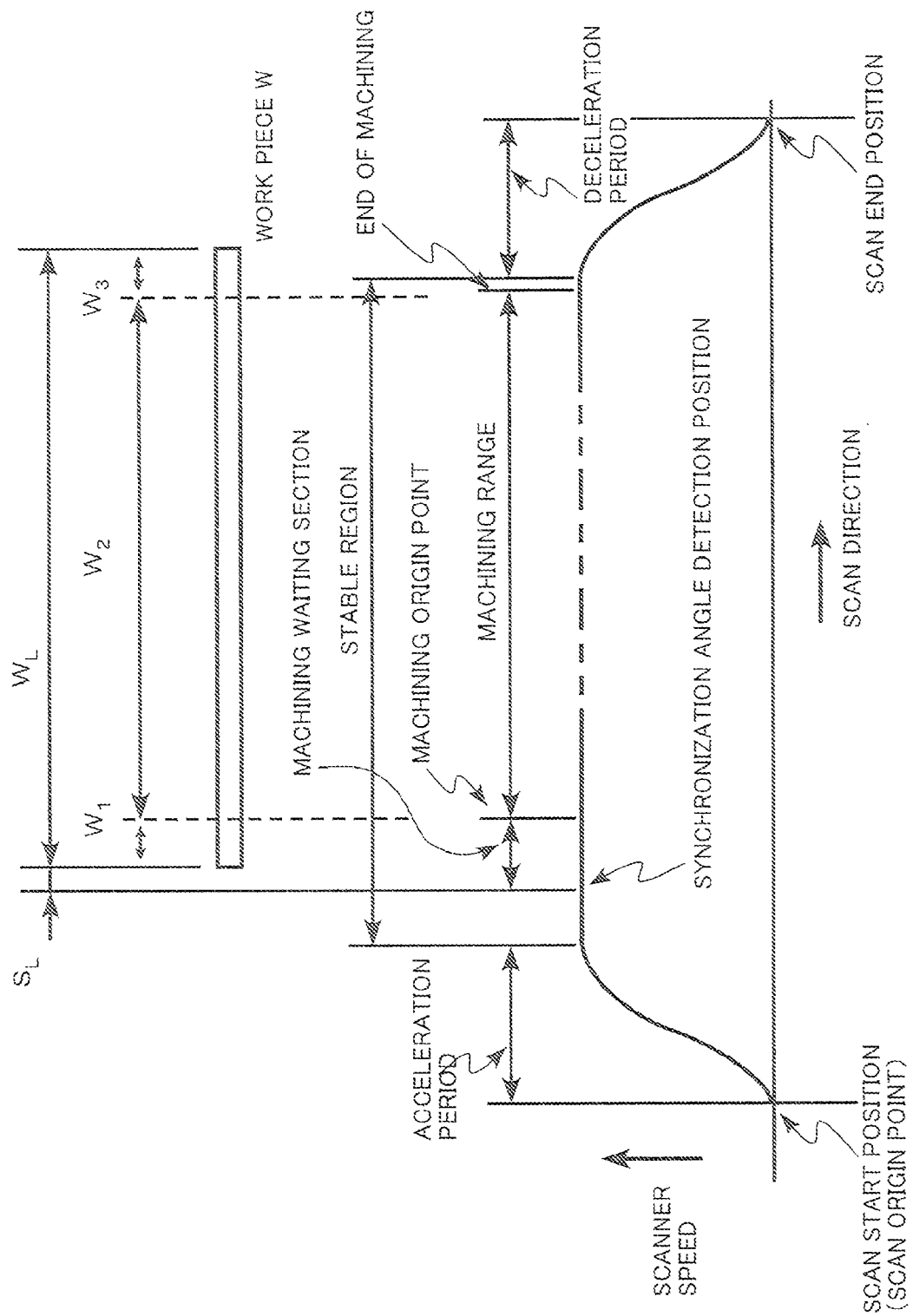
FIG. 3 is an explanatory diagram illustrating scanning of the laser beam scanner of the pulse laser machining apparatus according to the first embodiment.

In any of the above laser beam scanners, it is important to be configured to perform control such that the constant scanning speed V is ensured within a range in which machining is performed in order to improve the machining accuracy. FIG. 3 is a figure illustrating scanning of the laser beam scanner of the pulse laser machining apparatus according to the present embodiment. As shown in FIG. 3, a positional range corresponding to the range from a scan start position to a scan end position of a scan angle range of the scan mirror includes an acceleration period, a stable region, and a deceleration period. In order to improve the accuracy of machining, it is important to configure the apparatus so as to control the scanning speed V to be constant within the stable region including the actual machining range.

The XY stage unit 20 can hold the workpiece W, and includes an XY stage that can freely move in the XY directions including a direction perpendicular to the one-dimensional direction in which the pulse laser beam is scanned, and a drive mechanism unit, a position sensor having, for example, a laser interferometer for measuring the position of the XY stage, and the like. In this case, the XY stage can move continuously or stepwise in a wide two-dimensional range, for example, a distance range of about 1 m in the X direction and the Y direction. The accuracy of positioning and moving error are configured to achieve high-precision within a range of submicron.

The machining control unit 24 is constituted by hardware such as a microcontroller (MCU), a microprocessor (MPU), a digital signal processor (DSP), a semiconductor memory, a circuit board, and the like made of semiconductor integrated circuits, or a combination of the above hardware and software. The machining control unit 24 centrally controls the machining process of the pulse laser machining apparatus.

Figure 4:
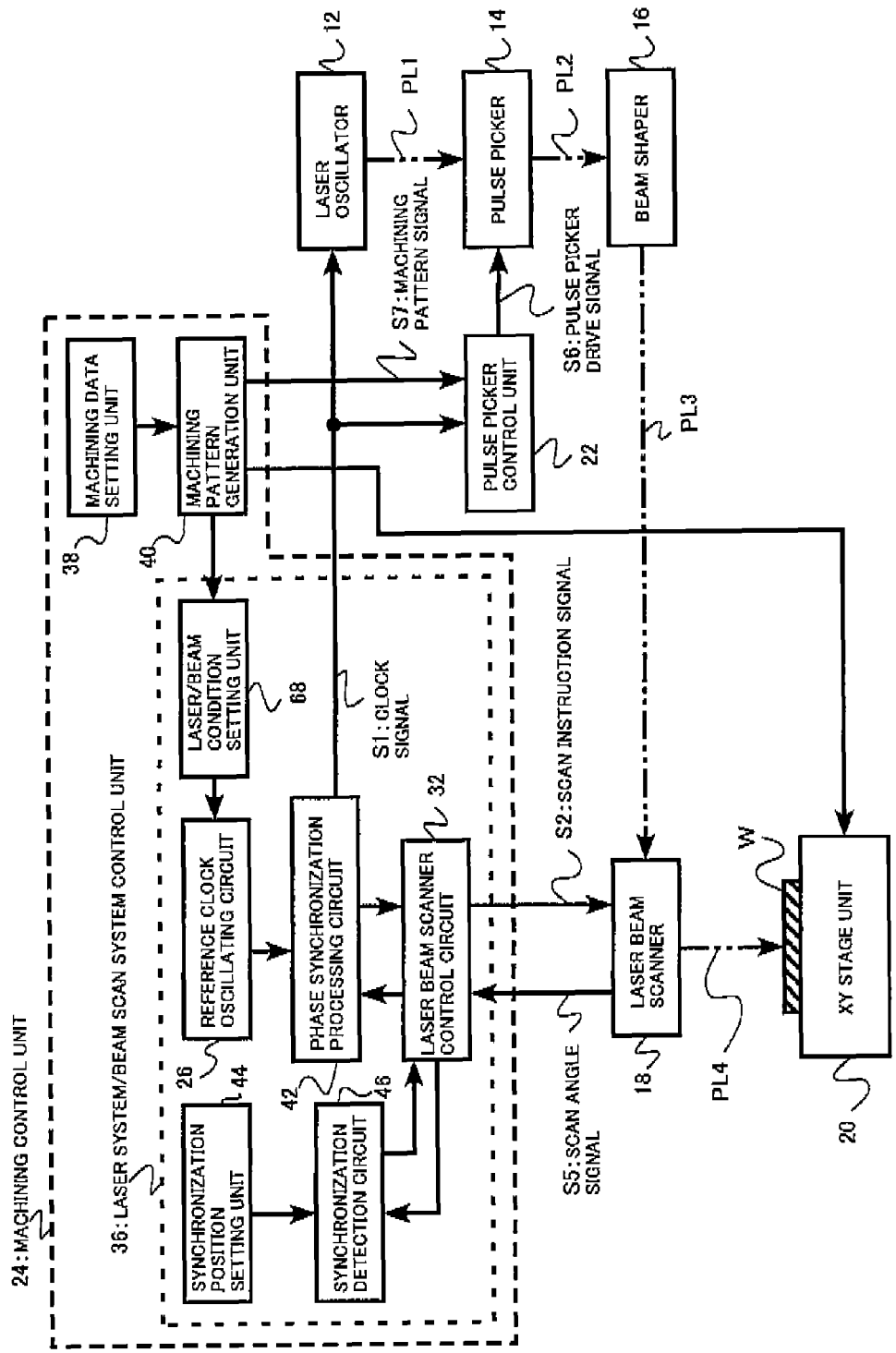
FIG. 4 is an explanatory diagram illustrating a machining control unit of the pulse laser machining apparatus according to the first embodiment.

FIG. 4 is an explanatory diagram illustrating a machining control unit of the pulse laser machining apparatus according to the present embodiment. The machining control unit 24 includes a laser system/beam scan system control unit 36, a machining data setting unit 38, and a machining pattern generation unit 40.

The laser system/beam scan system control unit 36 controls the laser system of the laser oscillator 12, the pulse picker 14 and the like and the beam scan system of the laser beam scanner 18 and the like. The laser system/beam scan system control unit 36 includes a laser/beam condition setting unit 68 for setting conditions of the laser system and the beam scan system and a reference clock oscillating circuit 26 generating a clock signal S1 for maintaining synchronization of the laser system and the beam scan system. In order to maintain synchronization of the laser system and the beam scan system, the laser system/beam scan system control unit 36 also includes a phase synchronization processing circuit 42, a laser beam scanner control circuit 32, a synchronization position setting unit 44, a synchronization detection circuit 46, and the like.

The machining pattern generation unit 40 converts, for example, machining data that are input from the outside to the machining data setting unit 40 into data of parameters suitable for actual machining. Examples of machining data input to the machining data setting unit 40 include specification of a three-dimensional shape, size, the number of shapes, arrangement, a name of material of a workpiece, a workpiece dimension, and the like.

Figure 5:
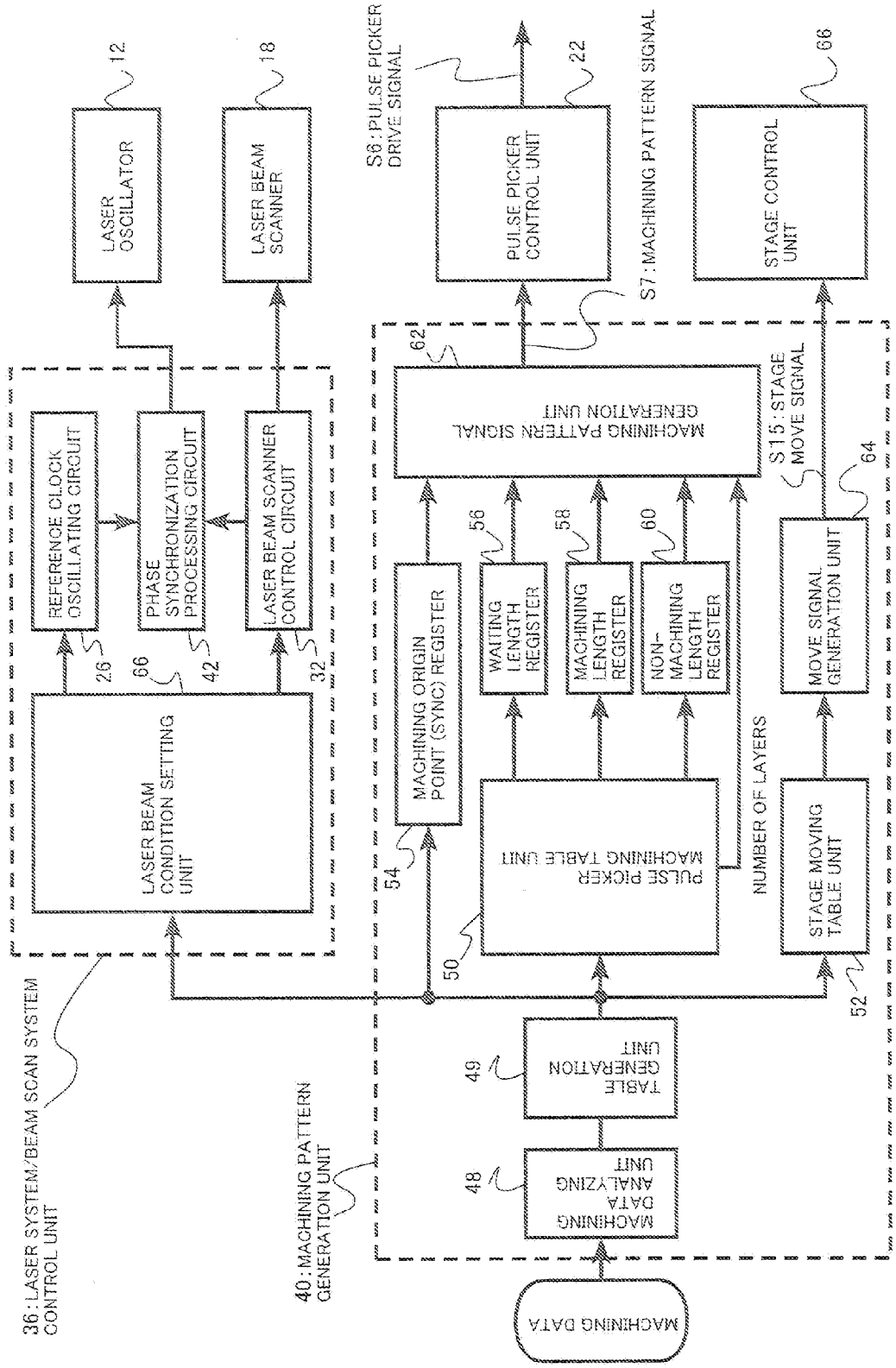
FIG. 5 is an explanatory diagram illustrating a machining pattern generation unit of the pulse laser machining apparatus according to the first embodiment.

FIG. 5 is an explanatory diagram illustrating a machining pattern generation unit of the pulse laser machining apparatus according to the present embodiment. The machining pattern generation unit 40 includes a machining data analyzing unit 48 for analyzing machining data that are input to the machining data setting unit 38. The machining pattern generation unit 40 includes a table generation unit 49 generating a machining table and a stage moving table on the basis of analysis of the machining data analyzing unit 48. The machining table describes, based on the number of light pulses of the pulse laser beam, a waiting length, a machining length, and a non-machining length, with regard to the machining pattern. That is, the table generation unit 49 generates a machining table on the basis of the machining length and the non-machining length of the machining data and the spot diameter of the pulse laser beam. The stage moving table describes a moving distance and the like of the XY stage unit with regard to the machining pattern.

The machining pattern generation unit 40 has a pulse picker machining table unit 50 having a machining table. The machining pattern generation unit 40 also has a stage moving table unit 52 having a stage moving table. The machining table and the stage moving table may be configured in the apparatus to be generated inside the machining pattern generation unit 40 as described above or to be generated outside of the machining pattern generation unit 40 and the pulse laser machining apparatus 10.

Further, the machining pattern generation unit 40 includes a machining origin point (SYNC) register 54 (hereinafter simply referred to as machining origin point register) receiving information about a machining origin point that is output from the pulse picker machining table unit 50. The machining pattern generation unit 40 also includes a waiting length register 56, a machining length register 58, an a non-machining length register 60 for receiving information about a waiting length, a machining length, and a non-machining length which are output from the pulse picker machining, table unit 50.

A machining pattern signal generation unit 62 receives values of the machining origin point register 54, waiting length register 56, the machining length register 58, and the non-machining length register 60, which are sent to the pulse picker control unit 22. A move signal generation unit 64 is configured to generate a stage move signal S15 on the basis of data given by the stage moving table unit 52, and output the stage move signal S15 to a stage control unit 66.

The data generated by the machining pattern generation unit 40 are also output to the laser system/beam scan system control unit 36, and are used for maintaining synchronization between the laser system and the beam scan system.

Figure 6:
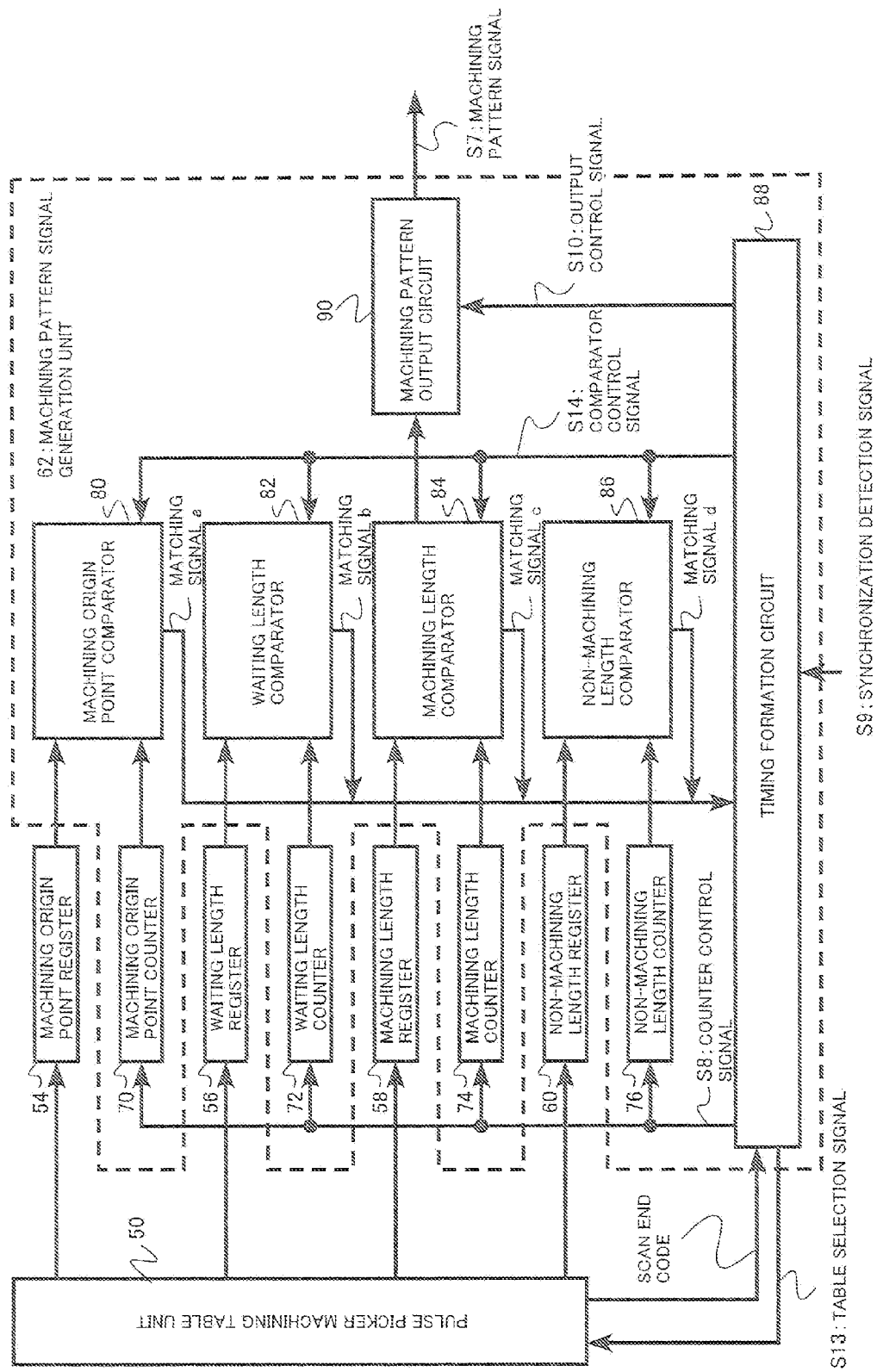
FIG. 6 is an explanatory diagram illustrating a machining pattern signal generation unit of the pulse laser machining apparatus according to the first embodiment.

FIG. 6 is an explanatory diagram illustrating a machining pattern signal generation unit of the pulse laser machining apparatus according to the present embodiment. The machining pattern signal generation unit 62 includes a machining origin point counter 70, a waiting length counter 72, a machining length counter 74, and a non-machining length counter 76. These counters are configured to start counting upon a counter control signal S8 that is output from a timing formation circuit 88.

In addition, a machining origin point comparator 80, a waiting length comparator 82, a machining length comparator 84, and a non-machining length comparator 86, which have functions for comparing the values of the registers and the counters, are provided. These comparators are configured to output matching signals a to d to the timing formation circuit 88 when the values of the registers and the counters match each other.

The timing formation circuit 88 is configured to output an output control signal S10 to a machining pattern output circuit 90 on the basis of an input synchronization detection signal S9, matching signals a to d, and a scan end code.

The machining pattern output circuit 90 is configured to generate a machining pattern signal S7 from the output of the machining length comparator 84 and the output control signal S10 provided by the timing formation circuit 88.

The machining control unit 24 generates an oscillation clock (clock signal) S1 given to the laser oscillator 12 on the basis of repeat frequency input data of the pulse laser beam in the reference clock oscillating circuit. Then, the laser oscillator 12 generates a pulse laser beam from the oscillation clock S1. In other words, the pulse laser beam in synchronization with the clock signal is emitted.

When a machining start instruction is given, an internal shutter is opened, so that a pulse laser beam PL1 is emitted. As described above, when the pulse laser beam PL1 is emitted, there is no first pulse, and stable output energy is maintained.

Further, the machining control unit 24 generates a machining pattern signal S7 from the two-dimensional machining data. Then, in accordance with the machining pattern signal S7, the pulse picker control unit 22 provides the pulse picker 14 with a pulse picker drive signal S6 of which synchronization with the pulse laser beam PL1 is ensured by the clock signal S1. As described above, in synchronization with the clock signal S1, the pulse picker 14 switches pass/cutoff of the pulse laser beam.

Further, the machining control unit 24 generates the scan instruction signal S2 of which synchronization with the clock signal S1 is ensured when scanning starts with the laser beam scanner 18. Then, the laser beam scanner control unit 32 of the laser beam scanner 18 receives the scan instruction signal S2 and drives and controls the laser beam scanner 18. As described above, in synchronization with the clock signal, the laser beam scanner 18 scans the pulse laser beam only in one-dimensional direction.

Further, the machining control unit 24 determines move timing of the X-Y stage unit 20 on the basis of the scan angle signal S5, i.e., the scan position signal given by the laser beam scanner 18, and generates a stage move signal S15 from the two-dimensional machining data and the move timing. In this case, the scan angle signal S5 is obtained from the scan angle detection signal S4 which is produced by the scan angle sensor 36 by detecting a machining end position where the machining explained in FIG. 3 is terminated or a scan end position where the scanner scan is terminated. Then, the X-Y stage unit 20 operates as instructed by the stage move signal S15.

As described above, for example, the movement of the X-Y stage is controlled in a direction perpendicular to a scan direction of the laser beam scanner, on the basis of the scan position signal of the laser beam scanner. As a result, a time to a subsequent scan is reduced, and the still higher speed in the laser beam machining is achieved.

Further, in the present embodiment, it is desirable to have a correction mechanism for correcting the machining origin point position for each scan on the basis of the scan position signal from the laser beam scanner. This is because, when this correction mechanism is provided, variation of the scanning speed is compensated in the acceleration period (see FIG. 3) of the laser beam scanner for each scan, and this allows still higher-precision machining.

It should be noted that, in FIG. 1, the machining control unit 24 may be configured to control the beam shaper 16, too. In particular, this case is effective when the beam shaper 16 automatically controls the beam diameter, or automatically adjusts the light intensity distribution of the cross section of the beam.

Subsequently, main operation of the pulse laser machining apparatus 10 will be explained. In the laser machining operation of the workpiece W, the laser oscillator 12 operates independently such that almost all of the laser oscillation is controlled by the control unit provided therein. However, timing and the like of the pulse oscillation are controlled by the reference clock oscillating circuit 26. This will be explained with reference to FIG. 7.

Figure 7:
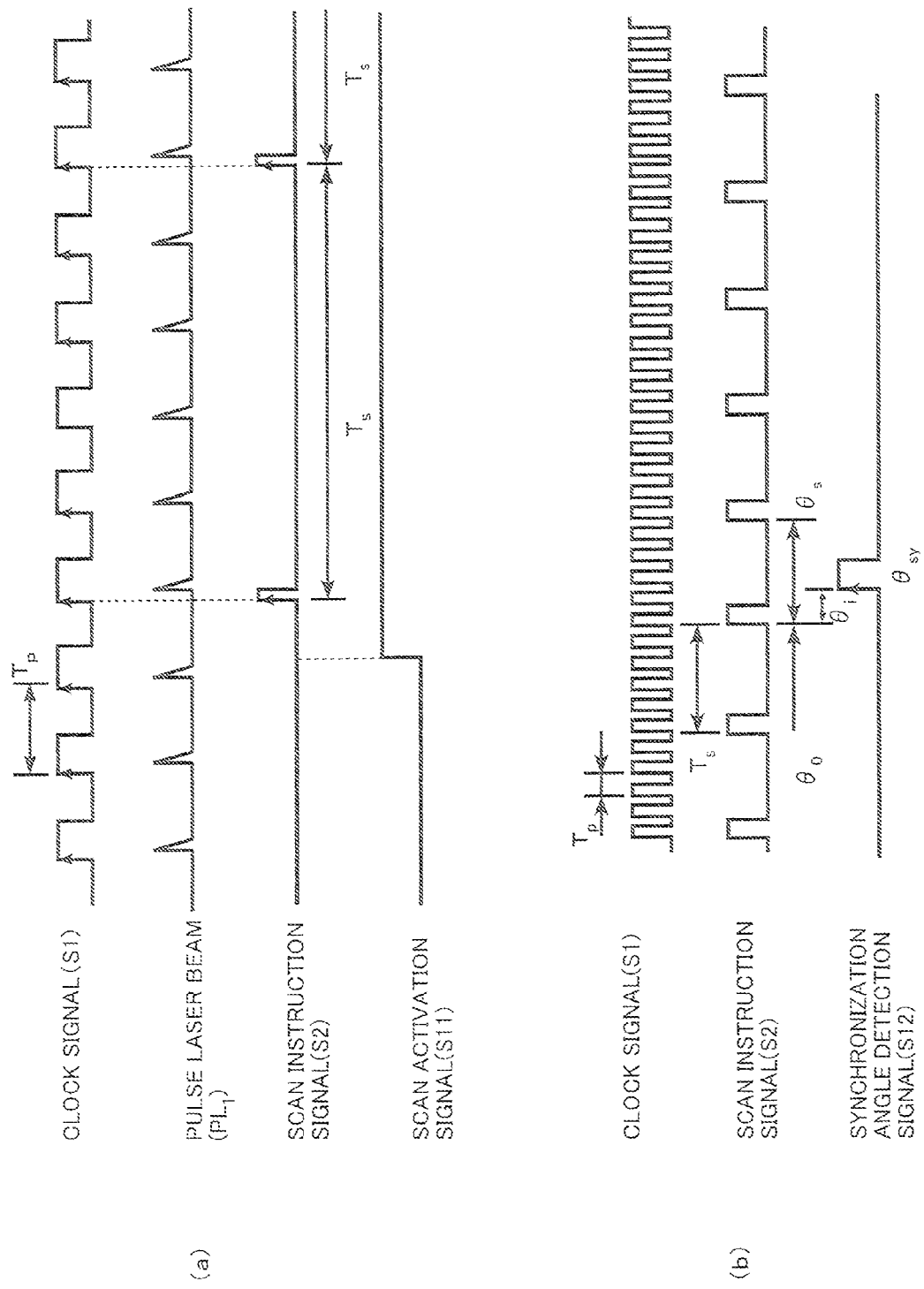
FIG. 7 is signal waveform diagrams for explaining timing control of the laser machining apparatus according to the first embodiment.

The single-axis scan mirror 28 of the Galvanometer scanner shown in FIG. 2 as an example of the laser beam scanner starts scanning at a scan start position (scan origin point) explained in FIG. 3 upon a scan activation signal. At this occasion, for example, the laser beam scanner 18 receives an instruction with the scan instruction signal S2 in synchronization with a rise (or fall) of the clock signal S1 as shown in FIG. 7(*a*), and the laser beam scanner control unit 32 drives and controls the Galvanometer 30. In this case, the scan instruction signal S2 supports XY2-100 protocol so that an absolute scan angle instruction is followed at, for example, 100 kHz (Ts=10 μsec).

It should be noted that FIG. 7(*a*) illustrates an example of the scan instruction signal S2 in synchronization with the rise of the clock signal S1 during scan activation when the oscillation frequency of the pulse laser is 500 kHz (Tp=2 μsec), the beam diameter of the pulse laser beam is 16 μm, and the scanning speed V is 4000 mm/sec. This kind of operation is performed for each scan of the pulse laser beam.

In this case, in the acceleration period of FIG. 3, the laser beam scanner control unit 32 drives and controls the Galvanometer 30 according to the scan instruction signal S2 so that the scanner speed attains the stable scanning speed V in a short time. In this case, the scan angle repeat reproducibility of the single-axis scan mirror 28 in the optimal condition is empirically confirmed to be about 10 μrad/p-p in a stable region. This value attains scan position reproducibility of 1 μm/p-p when the fθ lens has a focal length of 100 mm.

However, since the repeat stability in the acceleration period deteriorates about 10 times in long-term scan, it varies in each scan at a machining start position. Therefore, with the correction mechanism, the machining origin point position for each scan is corrected on the basis of the scan position signal (scan angle signal S5) provided by the laser beam scanner.

For example, when sufficient stable region (for example, empirically, when the acceleration period is 1 msec to 1.5 msec and the fθ lens has a focal length of 100 mm, the scan angle range thereof attains about 2.3 degrees to 3.4 degrees) is attained after the acceleration period is finished, and thereafter the scan angle sensor 36 detects a synchronization angle (θsy) set in advance as shown in FIG. 7(*b*) as a detection signal, a difference from a scan instruction signal (θo: scan angle from scan start position) is adopted as a phase difference (θi), and a distance to the machining origin point for the scan instruction signal S2 is corrected from this phase difference.

The distance correction value to the machining origin point is such that the first scan (i=1) during machining is stored as a reference correction value, and every time subsequent scan is performed from the n-th scan start position (i=n), a difference between the phase difference (θn) and the phase difference (θ1) is adopted as a distance correction value to the machining origin point for the scan instruction signal of the n-th scan with respect to the first scan, whereby the machining origin point position during the first scan and the machining origin point position during the n-th scan match each other.

Figure 8:
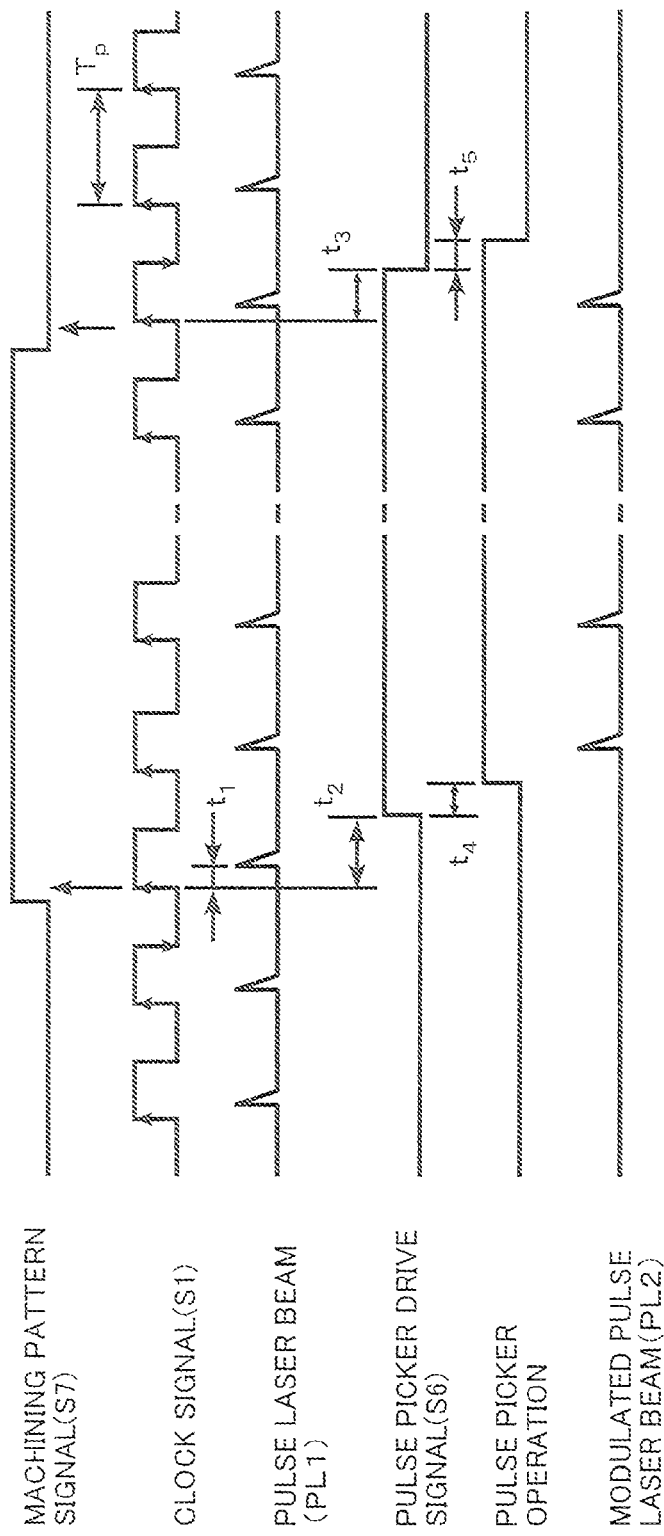
FIG. 8 is a signal waveform diagram for explaining timing control of pulse picker operation of the pulse laser machining apparatus according to the first embodiment.

The machining pattern signal S7 as shown in FIG. 8 is given from a three-dimensional bitmap including distance data from the machining origin point. For this reason, when the machining origin point position matches in every scan, the machining start position of the machining pattern signal S7 also matches, and the pulse picker drive signal S6 is also generated at a desired timing.

When the laser beam scanner 18 is made of the Galvanometer scanner explained in FIG. 2, the scanner clock signal serves as a drive signal given from the laser beam scanner control unit 32, with which a servo control motor is driven. However, the laser beam scanner 18 may involve phase displacement due to the independent operation. Therefore, with the synchronization angle detection signal serving as the scan position signal generated every time the scan operation is repeated, pass/cutoff of the oscillation pulse light and the scan operation of the beam are synchronized, i.e., performed in an exact timing, so as to enable extremely stable laser machining.

More specifically, for example, the correction mechanism controls pass/cutoff of the pulse laser beam in the pulse picker on the basis of the scan position signal (scan angle signal S5). That is, timing of the drive signal of the pulse picker 14 is specified on the basis of the phase difference detected from the scan position signal of the synchronization position (angle) detection of the rotational position of the scan mirror. Therefore, the machining origin point position is corrected for each scan of the pulse laser beam.

Alternatively, for example, the correction mechanism gives the distance correction value obtained from the phase difference detected from the scan position signal to the scan instruction signal subsequent to the scan instruction signal given to the laser beam scanner for the scan angle θo from the scan start position, so that the machining origin point position for every scan of the pulse laser beam is corrected.

With the pulse picker operation, the pulse laser beam is pulse-frequency-modulated, and a desired modulated pulse light is generated. This will be explained with reference to FIG. 8.

As shown in FIG. 8, the pulse laser beam PL1 with a delay of t1 from the clock signal S1 having a frequency Tp is subjected to operation of pass/cutoff with the pulse picker drive signal S6. For example, the pulse picker drive signal S6 is obtained by sampling the machining pattern signal S7 with a rise of the clock signal S1, and becomes a pattern signal that rises with a delay of t2 after a rise of a clock of the clock signal S1 and falls with a delay of t3 after the rise of another clock after a predetermined number of clocks. Then, with the pulse picker drive signal, the pulse picker 14 operates according to delays t4 and t5, and the pulse laser beam PL1 during the operation is extracted as a modulated pulse laser beam PL2. In this case, the delays t2, t3, t4, and t5 are set according to the pulse picker 14.

When the pulse picker 14 uses acousto-optic modulator (AOM), a reversed pattern signal of the pulse picker drive signal S6 is a driver signal for controlling ON/OFF of oscillation in the ultrasonic wave generation control unit. Then, with the driver signal having this reversed pattern, a desired oscillation pulse light is extracted.

As described above, move timing of the X-Y stage move unit 20 is instructed based upon the scan position signal (scan angle signal S5) given from the laser beam scanner 18 such as the scan position signal of the machining end position at the rotational position of the scan mirror. When the one-dimensional scan direction of the laser beam scanner 18 is an X-axis direction, stepwise movement or continuous movement is made for a predetermined width in the Y-axis direction according to the move timing. Alternatively, the X-Y stage makes continuous movement or stepwise movement for a predetermined distance in the X-axis direction. As described above, the movement of the X-Y stage is controlled according to the move pattern defined in advance.

For example, each pulse light of the modulated pulse laser beam PL2 generated with the pulse picker operation pattern is made into a desired shape by the beam shaper 16. With the scan in the X-axis direction by the laser beam scanner 18 and movement of the workpiece W in the Y-axis direction by the X-Y stage unit 20, an irradiation pulse light is projected at a desired position of the workpiece W, and the surface of the workpiece W is micromachined with high precision. The time width of each pulse picker operation and the time interval of each operation in the pulse picker operation pattern may be different.

Subsequently, a pulse laser machining method using the pulse laser machining apparatus 10 will be explained. This pulse laser machining method is a pulse laser machining method including the steps of mounting an object to be machined (workpiece) on a stage, generating a clock signal, emitting a pulse laser beam in synchronization with the clock signal, scanning the pulse laser beam onto a surface of the object to be machined in synchronization with the clock signal in one-dimensional direction, moving in a direction perpendicular to the one-dimensional direction after scanning the pulse laser beam in the one-dimensional direction, and further scanning the pulse laser beam in the one-dimensional direction in synchronization with the clock signal. When the pulse laser beam is scanned in the one-dimensional direction, irradiation/non-irradiation of the pulse laser beam is switched in Synchronization with the clock signal on the basis of the number of light pulses of the pulse laser beam.

FIGS. 7(a) and 7(b) are signal waveform diagrams for explaining timing control of the pulse laser machining apparatus according to the present embodiment. When the workpiece W placed on the stage is machined, the laser oscillator 12 operates independently such that almost most of the laser oscillation is controlled by the control unit provided therein. However, as shown in FIG. 7(a), with the clock signal S1 of the cycle Tp generated by the reference clock oscillating circuit, timing of the pulse oscillation is controlled, and the pulse laser beam PL1 of the cycle Tp is emitted in synchronization with the clock signal S1.

The laser beam scanner 18 activates scanning at the scan start position (scan origin point) as shown in FIG. 6 on the basis of the scan activation signal S11. At this occasion, as shown in FIG. 7(a), the laser beam scanner 18 receives instruction with the scan instruction signal S2 of the cycle Ts generated by the machining control unit 24, in synchronization with rise (or fall) of the clock signal S1. Then, on this basis of the scan instruction signal S2, the laser beam scanner control unit 32 drives and controls the Galvanometer 30.

As described above, the laser beam scanner 18 scans the pulse laser beam in one-dimensional direction in synchronization with the clock signal S1. At this occasion, a pattern is formed on the surface of the workpiece W by switching irradiation and non-irradiation of the pulse laser beam. It should be noted that the scan instruction signal S2 supports XY2-100 protocol, so that, for example, the absolute scan angle instruction based on a position of a scan angle of "0 degrees" of the Galvanometer 30 at 100 kHz (Ts=10 μsec) is followed.

FIG. 7(a) shows an example of the scan instruction signal S2 in synchronization with rise of the clock signal S1 during scan activation, when the oscillation frequency of the pulse laser beam is 500 kHz (Tp=2 μsec), and the beam diameter of the pulse laser beam is 16 μm, and the scanning speed V is 4000 mm/sec.

After the pulse laser beam is scanned in one-dimensional direction, the stage is moved in a direction perpendicular to the one-dimensional direction, and further, the pulse laser beam is scanned in the one-dimensional direction in synchronization with the clock signal. As described above, the scan of the pulse laser beam in one-dimensional direction and the move of the stage in the direction perpendicular to the one-dimensional direction are alternately performed.

In this case, move timing of the XY stage unit is instructed by a scan angle signal S5, i.e., a scan position signal given from the laser beam scanner 18. When the one-dimensional scan direction of the laser beam scanner 18 is an X-axis direction, stepwise movement or continuous movement is made for a predetermined width in the Y-axis direction according to the move timing. Thereafter, the pulse laser beam is scanned in the X direction.

In this case, in the acceleration period of FIG. 3, the laser beam scanner 18 is controlled by the scan instruction signal S2, so that the scanning speed attains the stable scanning speed V in a short time. It is empirically evident that in the stable region, about 10 μrad/p-p can be obtained as the scan angle repeat reproducibility of the single-axis scan mirror 28 in the optimal condition. This value attains scan position reproducibility of 1 μm/p-p when the fθ lens has a focal length of 100 mm.

However, the repeat stability of the scanning speed V in the acceleration period deteriorates about 10 times in long term scanning. Therefore, there is a possibility that the position of the machining origin point in FIG. 3 changes in each scan. For this reason, after the acceleration period is finished, the oscillation of the pulse laser beam PL1 and the synchronization angle (θsy) for synchronization with the beam scan are set in sufficiently stable region. The scan angle range before attaining sufficiently stable region is, for example, about 2.3 degrees to 3.4 degrees when the acceleration period is 1 msec to 1.5 msec and the fθ lens has a focal length of 100 mm.

As shown in FIG. 7(b), the synchronization angle is detected by the scan angle sensor 36. Then, a phase difference θi is obtained between the scan instruction signal S2 corresponding to the scan angle $θ_0$ and the scan start position when the synchronization angle is detected. Then, on the basis of this phase difference $θ_i$, the distance to the machining origin point with respect to the scan instruction signal S2 is corrected.

With respect to the correction value of the distance to the machining origin point, the first scan (i=1) during the machining is stored as a reference correction value. Then, on every scan from the n-th scan start position (i=n), the difference between the phase difference $θ_n$ and the phase difference $θ_1$ is adopted as a distance correction value to the machining origin point for the scan instruction signal S2 of the n-th scan with respect to the first scan. The obtained distance correction value is given to the scan instruction signal (S2: absolute scan angle instruction) subsequent to the scan instruction signal (S2) given for the scan angle $θ_0$ from the scan start position, so that the machining origin point position is corrected. In this manner, even when the scanning speed varies in the acceleration period of the laser beam scanner 18, the machining origin point positions for the first scan and the n-th scan can be made the same.

As described above, after the pulse laser beam is scanned in one-dimensional direction, the stage is moved in a direction perpendicular to the one-dimensional direction, and further, the pulse laser beam is scanned in the one-dimensional direction in synchronization with the clock signal S1. In such case the machining origin point position for each scan matches each other, and the accuracy of machining improves.

As described above, when the pulse laser beam is scanned in one-dimensional direction, irradiation and non-irradiation of the pulse laser beam is switched in synchronization with the clock signal S1 on the basis of the number of light pulses of the pulse laser beam. Irradiation and non-irradiation of the pulse laser beam is performed using the pulse picker.

As shown in FIG. 3, the variables are defined as follows.

$S_L$: distance from synchronization angle detection position to workpiece $W_L$: workpiece length $W_1$: distance from the end of the workpiece to the machining origin point $W_2$: machining range $W_3$: distance from the end of the machining to the end of the workpiece In this case, the following equation holds: machining origin point=synchronization angle detection position+$S_L$+$W_1$. The workpiece is installed at a fixed position on the stage. Therefore, $S_L$ is also a fixed distance. Further, the machining origin point (which will be hereinafter also referred to as machining origin point (SYNC)) on the workpiece adopting the synchronization angle detection position as a reference is as follows.

$$\text{machining origin point (SYNC)} = S_L + W_1$$

This machining origin point (SYNC) is managed by performing correction as described above, and machining is always started from a stable position for each scan. As shown in FIG. 3, the actual machining is done within a range fit in the machining range ($W_2$).

For example, the machining speed V (m/sec) is as follows where scan is performed under the machining condition of a beam spot diameter D (μm) and a beam frequency F (kHz), and the irradiation position of the beam is shifted by every 1/n of the spot diameter.

$$V = D \times 10^{-6} \times F \times 10^3 / n$$

When machining is performed by controlling the light pulse with the pulse picker, a region actually machined can be defined by a machining length and a repeat machining pitch can be defined by a non-machining length in the pulse picker drive signal S6 generated by the pulse picker. In this case, where the machining length is denoted as $L_1$, and the non-machining length is denoted as $L_2$, the machining length register can be set as follows on the basis of the number of light pulses of the pulse laser beam.

$$\text{the number of machining pulses} = (L_1/(D/n)) - 1$$

The non-machining length register can be set as follows.

$$\text{the number of non-machining pulses} = (L_2/(D/n)) + 1$$

The position where machining is actually started from the machining origin point (SYNC) is defined as a waiting length, so that a start position for each machining shape is set. In this case, where the waiting length is denoted as $L_w$, the machining origin point (SYNC) register can be set as follows.

$$\text{machining origin point (SYNC) the number of light pulses} = (S_L + W_1)/(D/n)$$

The waiting length register can be set as follows.

$$\text{waiting length the number of light pulses} = L_w/(D/n)$$

It should be noted that setting values set in the respective registers for the machining length, the non-machining length, the waiting length, and the machining origin, point (SYNC) are the numbers of light pulses respectively corresponding thereto. The number of light pulses is a value set in view of the number of light pulses for correction that is determined in advance on the basis of the used beam profile.

The register setting value is managed with the number of light pulses to be emitted. The machining waiting section after the detection of the synchronization angle is also managed by the number of light pulses. As described above, the pulse picker is managed with the number of light pulses, so that it is easy to maintain synchronization between the pulse picker and the clock signal S1 serving as the reference, and stable repeatability is maintained. Further, by maintaining synchronization between the clock signal S1 and the pulse picker 14, high-precision laser machining is easily achieved.

FIG. 8 is a signal waveform diagram for explaining timing control of pulse picker operation of the pulse laser machining apparatus according to the present embodiment. The machining pattern signal S7 generated from the machining data and managed with the number of light pulses is output from the machining pattern output circuit 62 of the machining pattern signal generation unit 40.

As shown in FIG. 8, cutoff/pass of the pulse laser beam (PL1) with a delay of $t_1$ with respect to the clock signal S1 of the cycle Tp is controlled based on the pulse picker drive signal S6. It should be noted that the synchronization between cutoff/pass of the pulse laser beam and the scan of the laser beam scanner 18 is made by synchronizing the timing of generation of the scan angle instruction signal (S2) with the clock signal (S1).

For example, with the pulse picker drive signal S6, the machining pattern signal S7 is sampled with rise of the clock signal S1. Then, there is a rise with a delay of $t_2$ from the rise of a clock of the clock signal S1. Then, after the number of clocks corresponding to the desired number of pulses, the state in which the machining pattern signal S7 is inactive is sampled with rise of the clock signal S1, and then there is a fall with a delay of $t_3$.

With the pulse picker drive signal S6, operation of the pulse picker 14 occurs after delays $t_4$ and $t_5$ pass. With the operation of this pulse picker 14, the pulse laser beam (PL1) is extracted as a modulated pulse laser beam (PL2).

In this case, examples of machining data include specification of a three-dimensional shape, size, the number of shapes, arrangement position, a name of material of a workpiece, a workpiece dimension, and the like. The machining data are analyzed by the machining data analyzing unit 48 of the machining pattern generation unit 40. Then, the amount of machining of the unit light pulse is empirically obtained from conditions such as the irradiation pulse energy, the beam spot diameter, the repeat frequency, the scanning speed, and the amount of move of the stage, i.e., oscillator operation and beam scan conditions of the laser used for machining.

Based on the above conditions, it is further decomposed into two-dimensional layers from the three-dimensional shape, and the layers are converted into two-dimensional data including bitmap data and the like for the respective layers. The two-dimensional data are converted into operation data of the pulse picker 14 (the number of machining pulses, the number of non-machining pulses, and the number of waiting length pulses).

For example, when Cu material is machined, the machining speed V is 3.75 m/sec if operation is performed under the following machining conditions: the beam spot diameter D=15 the repeat frequency F=500 kHz, and the beam irradiation move ratio n=2. When the irradiation pulse energy is 1 μJ/pulse, the machining depth is 0.1 μm. Therefore, the layer resolution width of the machining shape may be set at 0.1 μm. It should be noted that the number of layers thus decomposed is referred to as the number of layers Rn.

Figure 9:
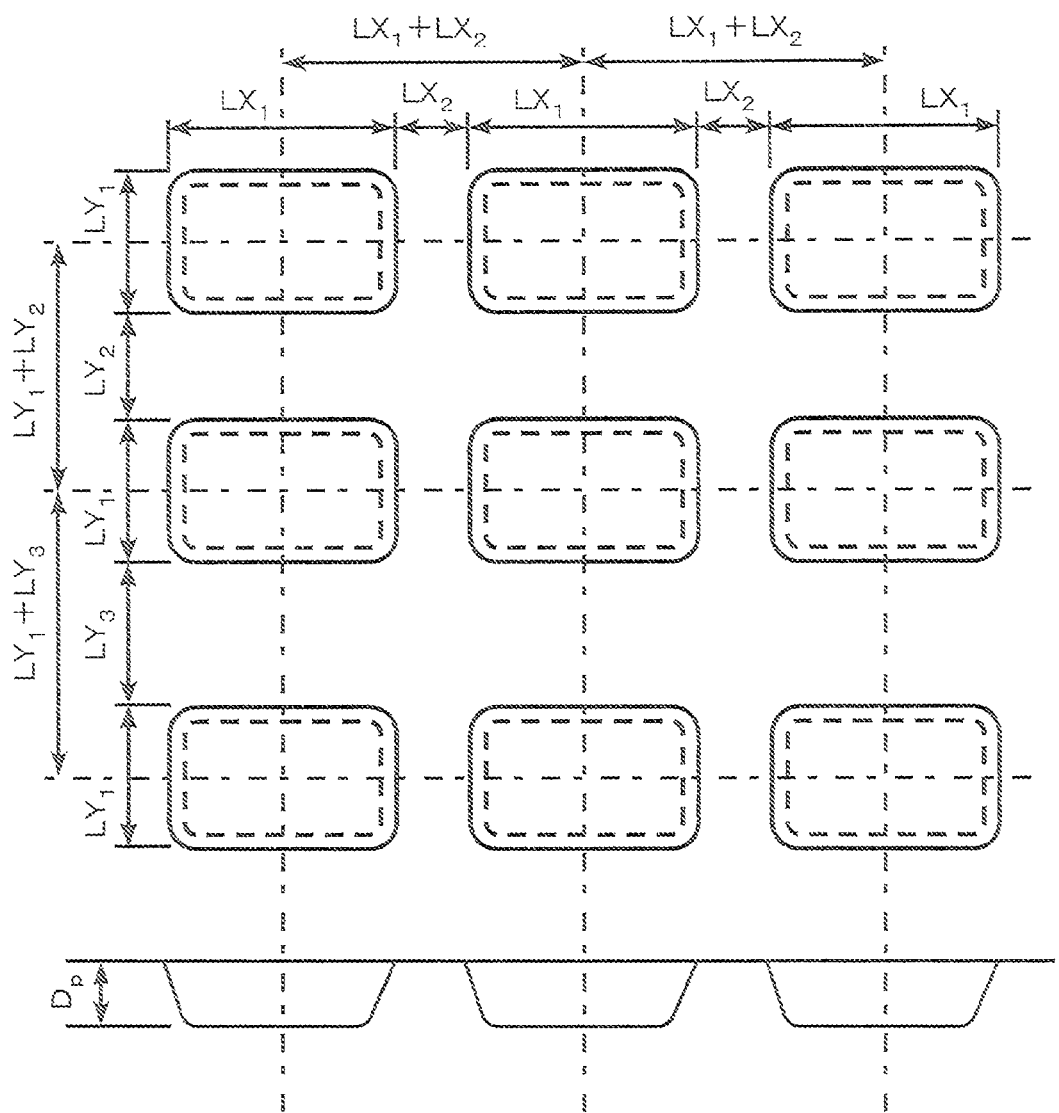
FIG. 9 is a diagram illustrating an example of machining with the pulse laser machining apparatus according to the first embodiment.
Figure 10:
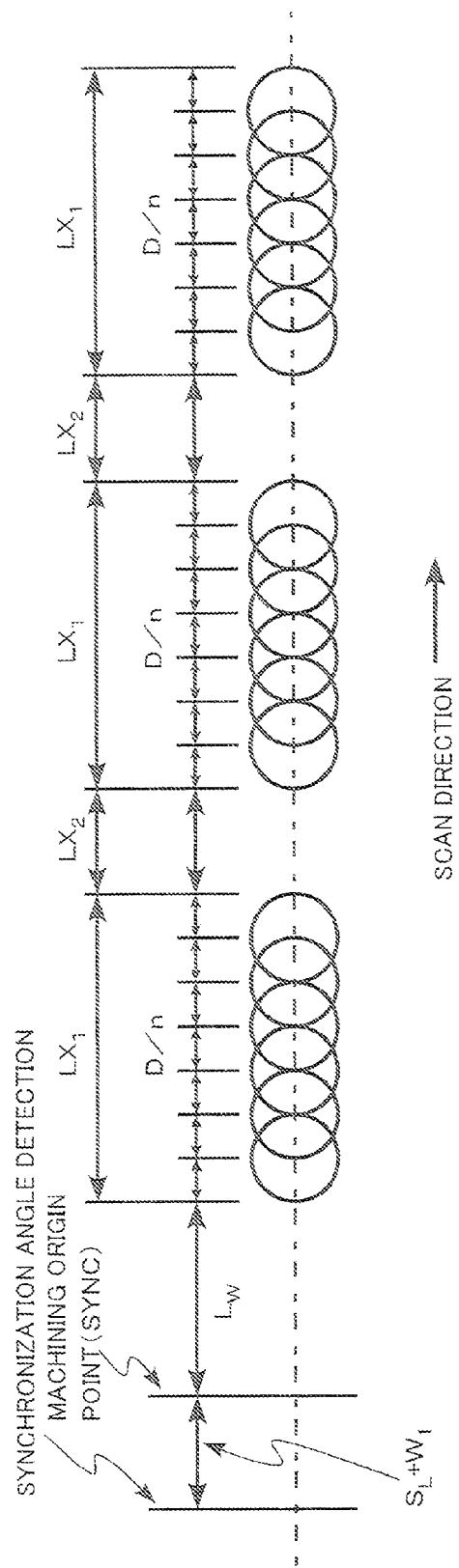
FIG. 10 is a figure illustrating scanning in a particular one-dimensional direction in the machining of FIG. 9.
Figure 11:
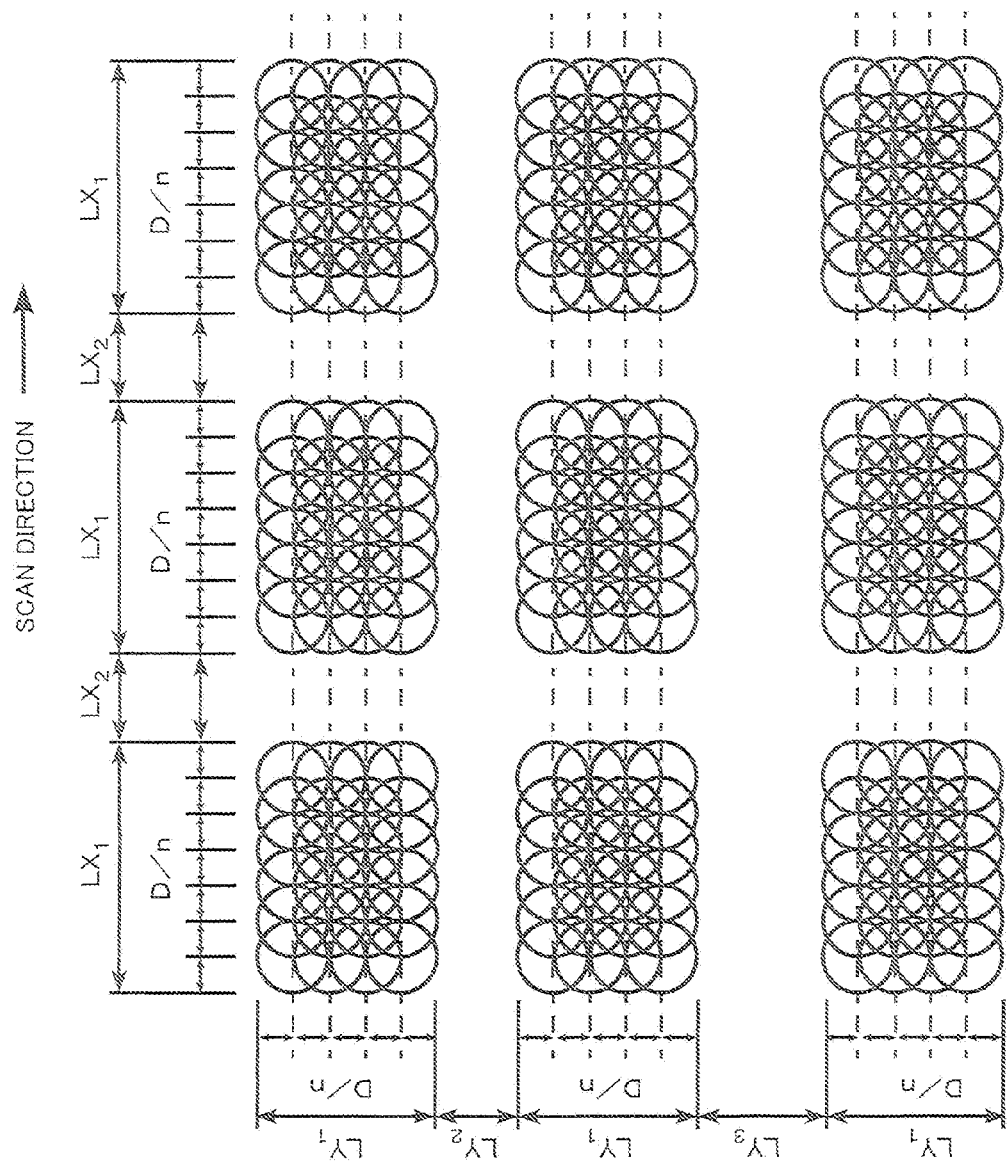
FIG. 11 is a figure illustrating two-dimensional machining of a particular layer in the machining of FIG. 9.

Subsequently, the pulse picker operation data of the respective layers, i.e., the number of machining pulses, the number of non-machining pulses, and the number of waiting length pulses will be explained. FIG. 9 illustrates an example of machining with the pulse laser machining apparatus according to the embodiment. FIG. 10 is a figure illustrating scanning in a particular one-dimensional direction in the machining of FIG. 9. FIG. 11 is a figure illustrating two-dimensional machining of a particular layer in the machining of FIG. 9.

As shown in FIG. 9, for example, nine pockets each having a dimension of $LX_1$ (width)×$LY_1$ (length)×Dp (depth), and more specifically nine pockets each having a dimension of, for example, 52.5 μm×37.5 μm×0.1 Rn μm, are formed on the workpiece W. In this example of machining, in the X direction, i.e., beam scan direction, machining is performed for the machining length of $LX_1$ and the non-machining length of $LX_2$, and in the Y direction, i.e., stage move direction, machining is performed for the non-machining lengths of $LY_2$ and $LY_3$ with the machining length of $LY_1$.

FIG. 10 illustrates scanning in one-dimensional direction of one line within a region corresponding to $LY_1$ in the Y direction. The pulse laser beam is emitted onto the workpiece with $S_1+W_1$ from the synchronization angle detection position, Lw based on the machining origin point (SYNC) ($S_L+W_1$)/(D/n) away as the number of light pulses, and a waiting length of $L_w/(D/n)$ as the number of light pulses. This irradiation is $(LX_1/(D/n))-1$ as the number of light pulses. Thereafter, no irradiation is made for $(LX_2/(D/n))+1$ as the number of light pulses, and further, irradiation and non-irradiation managed with the number of light pulses are repeated in the same scan.

When the laser beam scanner 18 scanning only in the one-dimensional direction finishes a line scan in a particular X direction, the stage is moved in the Y direction perpendicular to the X direction, and the laser beam scanner 18 further scans in the X direction. That is, the scan of the pulse laser beam in one-dimensional direction with the laser beam scanner 18 and the move of the stage in the direction perpendicular to the one-dimensional direction subsequent to this scan are alternately repeated, whereby the object to be machined is machined.

In this manner, the two-dimensional machining is done on the particular layer as shown in FIG. 11. Further, another layer generated by layer decomposition is two-dimensionally machined according to the same method as that shown in FIG. 11. This kind of machining for each layer is repeated, and ultimately, machining of three-dimensional pockets as shown in FIG. 9 is finished.

Subsequently, using FIGS. 5 and 6, operation of the machining control unit 24 will be explained in detail. In the machining pattern generation unit 40 within the machining control unit 24, when the synchronization detection signal S9 generated when the phase synchronization circuit 42 detects synchronization is input to the timing formation circuit 88, a table selection signal S13 "machining origin point (SYNC)" is output to the pulse picker machining table unit 50. Then, information about the machining origin point is output from the pulse picker machining table unit 50, and is loaded to the machining origin point register 54. At the same time, the machining origin point (SYNC) counter 70 (which may be hereinafter simply referred to as machining origin point counter) starts counting the clock signal S1.

Then, the comparator control signal S14 enables the machining origin point (SYNC) comparator 80 (which may be hereinafter simply referred to as machining Origin point comparator), and the value of the machining origin point counter 70 and the value of the machining origin point register 54 are compared. When they match each other, a matching signal a is output from the machining origin point comparator 80 to the timing formation circuit 88. At this occasion, the pulse laser beam is scanned to the machining origin point position.

Subsequently, the timing formation circuit 88 outputs the counter control signal S8, and stops counting of the machining origin point counter 70. Then, a table selection signal S13 "waiting length" is output from the timing formation circuit 88 to the pulse picker machining table unit 50. Information about the waiting length is output from the pulse picker machining table unit 50 and is loaded to the waiting length register 56. At the same time, with the counter control signal S8, the waiting length counter 72 starts counting the clock signal S1.

Then, the comparator control signal S14 enables the waiting length comparator 82, and the value of the waiting length counter 72 and the value of the waiting length register 56 are compared. When they match each other, the waiting length comparator 82 outputs a matching signal b to the timing formation circuit 88. At this occasion, the pulse laser beam is scanned to the actual machining start position.

Subsequently, the timing formation circuit 88 outputs the counter control signal S8, and stops counting of the waiting length counter 72. Then, a table selection signal S13 "machining length" is output from the timing formation circuit 88 to the pulse picker machining table unit 50. Information about the machining length is output from the pulse picker machining table unit 50 and is loaded to the machining length register 58. At the same time, with the counter control signal S8, the machining length counter 74 starts counting the clock signal S1.

Then, the comparator control signal S14 enables the machining length comparator 84, and the value of the machining length counter 74 and the value of the machining length register 58 are compared. When they match each other, the machining length comparator 84 outputs a matching signal c to the timing formation circuit 88. At this occasion, the pulse laser beam is scanned to the position where the machining is terminated.

Subsequently, the timing formation circuit 88 outputs the counter control signal S8, and stops counting of the machining length counter 74. Then, a table selection signal S13 "non-machining length" is output from the timing formation circuit 88 to the pulse picker machining table unit 50. Information about the non-machining length is output from the pulse picker machining table unit 50 and is loaded to the non-machining length register 60. At the same time, with the counter control signal S8, the non-machining length counter 76 starts counting of the clock signal S1.

Then, comparator control signal S14 enables the non-machining length comparator 86, and the value of the non-machining length counter 76 and the value of the non-machining length register 60 are compared. When they match each other, the non-machining length comparator 86 outputs a matching signal d to the timing formation circuit 88. At this occasion, the pulse laser beam is scanned to the non-machining end portion. Then, the scanning is completed to a position one light pulse prior to the position where the actual machining starts.

Subsequently, the timing formation circuit 88 outputs the counter control signal S8, and stops counting of the non-machining length counter 76. Then, a table selection signal S13 "machining length" is output from the timing formation circuit 88 to the pulse picker machining table unit 50. Information about the machining length is output from the pulse picker machining table unit 50 and is loaded to the machining length register 58. At the same time, with the counter control signal S8, the machining length counter 74 starts counting the clock signal S1.

Then, the comparator control signal S14 enables the machining length comparator 84, and the value of the machining length counter 74 and the value of the machining length register 58 are compared. When they match each other, the machining length comparator 84 outputs a matching signal c to the timing formation circuit 88. At this occasion, the pulse laser beam is scanned to the position where the machining is terminated.

Subsequently, the timing formation circuit 88 outputs the counter control signal S8, and stops counting of the machining length counter 74. Then, a table selection signal S13 "non-machining length" is output from the timing formation circuit 88 to the pulse picker machining table unit 50. Information about the non-machining length is output from the pulse picker machining table unit 50 and is loaded to the non-machining length register 60. At the same time, with the counter control signal S8, the non-machining length counter 76 starts counting of the clock signal S1.

Then, comparator control signal S14 enables the non-machining length comparator 86, and the value of the non-machining length counter 76 and the value of the non-machining length register 60 are compared. When they match each other, the non-machining length comparator 86 outputs a matching signal d to the timing formation circuit 88. At this occasion, the pulse laser beam is scanned to the non-machining end portion. Then, the scanning is completed to a position one light pulse prior to the position where the actual machining starts.

In the above process, the machining pattern output circuit 90 recognizes the machining execution period according to the output of the machining length comparator 84, and further, outputs the machining pattern signal S7 in response to the output control signal S10 given by the timing formation circuit 88. The timing control of the pulse picker operation based on the machining pattern signal S7 is as shown in FIG. 8.

As described above, the machining pattern generation unit 40 performs one-dimensional scan of the pulse laser beam as shown in FIG. 10 according to the pulse picker machining table provided within the pulse picker machining table unit 50. The pulse picker machining table unit 50 is provided with a scan end code, and after a particular beam scan is finished, it is output to the timing formation circuit 88.

When the timing formation circuit 88 recognizes the scan end code, the stage is moved, and the amount of movement of the stage is read from the stage moving table Unit 52. Then, a stage move signal S15 including the amount of movement of the stage and the stage move start instruction is output from the move signal generation unit 64 to the stage control unit 66. When the process for moving the stage is performed, it is recognized that the machining of the line is finished.

When the move of the stage to a direction perpendicular to the scan of the line is finished and the preparation of the beam scan for the next line is completed, the beam scan of the next line is started. The machining with the beam scan in one-dimensional direction is carried out according to the same process as the above. The predetermined number of beam scans and the moving of the stage are finished, the machining of the two-dimensional layer is terminated.

A determination as to whether the machining of the two-dimensional layer is finished or not is made based on a move termination code provided on a stage moving table unit 52. When the move termination code is confirmed, the stage is controlled to move to the first line.

As described above, the beam scan is performed and the stage is moved according to respective data, i.e., the "pulse picker machining table" and the "stage moving table", and the machining of the respective layers is executed. Then, the predetermined number of layers given by Rn are processed.

Table 1 is an example of a table according to an embodiment. Table 1 is an example where the pulse picker machining table and the stage moving table are described in the same table. In Table 1, the waiting length, the machining length, and the non-machining length are described as the numbers of light pulses. It should be noted that the pulse picker machining table and the stage moving table may exist as separate tables.

TABLE 1

| LINE No. | STAGE MOVE (μm) | WAITING LENGTH | SHAPE 1 | | SHAPE 2 | | SHAPE 3 | | SHAPE 4 | |
|---|---|---|---|---|---|---|---|---|---|---|
| | | | MACHINING LENGTH | NON-MACHINING LENGTH | MACHINING LENGTH | NON-MACHINING LENGTH | MACHINING LENGTH | NON-MACHINING LENGTH | MACHINING LENGTH | NON-MACHINING LENGTH |
| 1 | 7.5 | 10 | 6 | 3 | 6 | 3 | 6 | 3 | 0 | 0 |
| 2 | 7.5 | 10 | 6 | 3 | 6 | 3 | 6 | 3 | 0 | 0 |
| 3 | 7.5 | 10 | 6 | 3 | 6 | 3 | 6 | 3 | 0 | 0 |
| 4 | 7.5 | 10 | 6 | 3 | 6 | 3 | 6 | 3 | 0 | 0 |
| 5 | 22.5 | 10 | 6 | 3 | 6 | 3 | 6 | 3 | 0 | 0 |
| 6 | 7.5 | 10 | 6 | 3 | 6 | 3 | 6 | 3 | 0 | 0 |
| 7 | 7.5 | 10 | 6 | 3 | 6 | 3 | 6 | 3 | 0 | 0 |
| 8 | 7.5 | 10 | 6 | 3 | 6 | 3 | 6 | 3 | 0 | 0 |
| 9 | 30 | 10 | 6 | 3 | 6 | 3 | 6 | 3 | 0 | 0 |
| 10 | 7.5 | 10 | 6 | 3 | 6 | 3 | 6 | 3 | 0 | 0 |
| 11 | 7.5 | 10 | 6 | 3 | 6 | 3 | 6 | 3 | 0 | 0 |
| 12 | 7.5 | 10 | 6 | 3 | 6 | 3 | 6 | 3 | 0 | 0 |
| 13 | 0 | | | | | | | | | |

Second Embodiment

The present embodiment relates to a method for manufacturing a mold for a micro lens using the pulse laser machining apparatus and the pulse laser machining method according to the first embodiment, a mold for a micro lens manufactured by using the same, and a method for manufacturing a micro lens using the mold for the micro lens.

Figure 12:
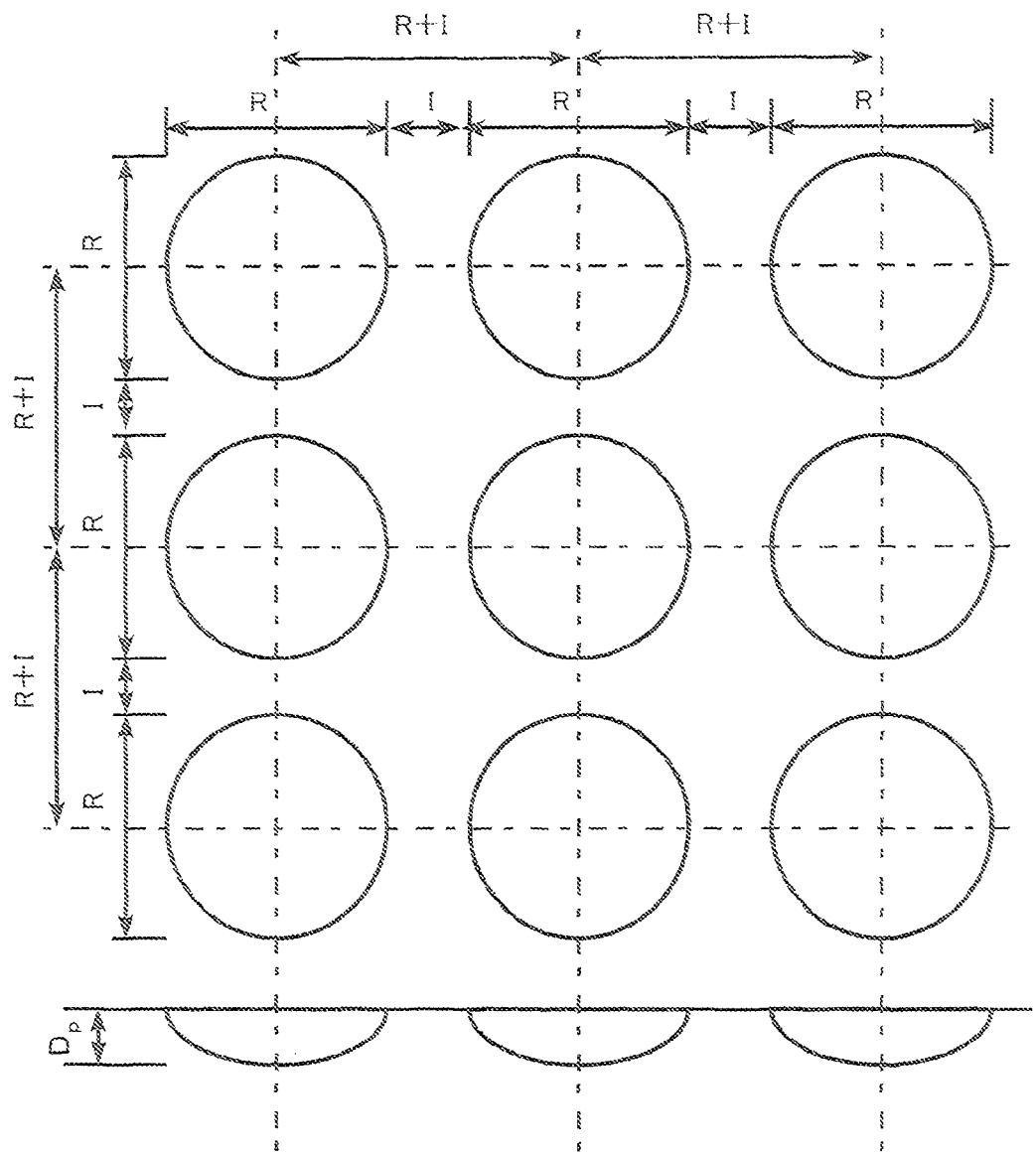
FIG. 12 is an example of machining of a mold formed according to a manufacturing method of a second embodiment.

For example, a micro lens used for a flat panel display is required to have a large size of area and a high level of accuracy of machining. For this reason, when the micro lens is manufactured using the mold, the mold is naturally required to have a large size of area and a high level of accuracy. FIG. 12 is an example of machining of a mold formed according to the manufacturing method of the present embodiment.

As shown in FIG. 12, for example, nine dimples having a diameter R and a depth Dp are formed with an interval I on a workpiece made of Cu material. The laser machining is done according to the same method as the first, embodiment. A table according to a three-dimensional shape of FIG. 12 is used as a machining table, which achieves machining as shown in FIG. 12. According to the present embodiment, the mold for the micro lens having the large size of area and high degree of precision can be manufactured.

Further, this mold for the micro lens is useful for manufacturing a micro lens having a large size of area and a high degree of precision. In addition, according to this manufacturing method for manufacturing the micro lens using the mold for the micro lens, the mold for the micro lens having the large size of area and high degree of precision can be manufactured.

Embodiments of the present invention have been hereinabove explained with reference to specific examples. However, the present invention is not limited to these specific examples. Description about portions of the pulse laser machining apparatus, the pulse laser machining method, and the like that are not directly needed in the explanation about the present invention has been omitted. However, it is possible to appropriately select and use a required pulse laser machining apparatus and pulse laser machining method. All pulse laser machining apparatuses and pulse laser machining methods which have elements of the present invention and of which design can be changed as necessary by a person skilled in the art are included in the scope of the present invention.

For example, in the embodiments, machining of pockets and dimples has been explained. However, the shapes are not limited thereto. For example, embodiments may be a pulse laser machining apparatus or a pulse laser machining method for machining any shape such as a cone, a triangular pyramid, a square spindle, a V groove, a recessed groove, an R groove or the like or machining a combination of these shapes for manufacturing ribs for electronic paper.

In the above explanation, for example, Cu material has been mainly explained as an example of an object to be machined. However, for example, other materials may be used such as metal material such as Ni material, SKD11, DLC material, polymeric materials, semiconductor material, and glass material.

The laser oscillator is not limited to YAG laser. For example, those outputting single wavelength band laser such as the second harmonic of Nd:$YVO_4$ laser (wavelength: 532 nm) or multiple wavelength band laser suitable for machining an object may be used.

REFERENCE SIGNS LIST

10 pulse laser machining apparatus
12 laser oscillator
14 pulse picker
18 laser beam scanner
20 XY stage unit
22 pulse picker control unit
26 clock oscillation circuit
49 table generation unit

The invention claimed is:

1. A pulse laser machining apparatus comprising:
a reference clock oscillating circuit for generating a clock signal;
a laser oscillator for emitting a pulse laser beam in synchronization with the clock signal;
a laser beam scanner for scanning the pulse laser beam in synchronization with the clock signal only in a one-dimensional direction, the laser beam scanner including a rotary encoder and a laser beam scanner control unit, the rotary encoder transmitting a scan angle detected signal to the laser beam scanner control unit, the laser beam scanner control unit configured to output a scan angle signal based on the scan angle detected signal;
a stage capable of holding an object to be machined thereon and moving in a direction perpendicular to the one-dimensional direction, the stage configured to be in a stationary state while the laser beam scanner scans the pulse laser beam;
a pulse picker provided in an optical path between the laser oscillator and the laser beam scanner to pass/cutoff the pulse laser beam in synchronization with the clock signal;
a pulse picker control unit for controlling the pulse picker on the basis of the number of light pulses of the pulse laser beam;
a machining control unit configured to determine a timing of movement of the stage based on the scan angle signal, the machining control unit directing start of a movement of the stage when receiving the scan angle signal indicating an end of a scan of the pulse laser beam by the laser beam scanner; and
a correction mechanism for correcting a machining origin point position for each scan on the basis of the scan angle detected signal, wherein the correction mechanism controls pass/cutoff of the pulse laser beam in the pulse picker on the basis of the scan angle detected signal.

2. A pulse laser machining apparatus according to claim 1 further comprising a table generation unit for generating a machining table describing input machining data of the object to be machined as the number of light pulses of the pulse laser beam, wherein the pulse picker control unit controls the pulse picker on the basis of the machining table.

3. A pulse laser machining apparatus according to claim 2, wherein the table generation unit generates the machining table on the basis of a machining length and a non-machining length of the machining data and on the basis of a spot diameter of the pulse laser beam.

4. A pulse laser machining apparatus according to claim 1, wherein the scan of the pulse laser beam in the one-dimensional direction with the laser beam scanner and the movement of the stage in the direction perpendicular to the one-dimensional direction subsequent to the scan are alternately repeated.

5. A pulse laser machining apparatus according to claim 1 wherein the laser beam scanner includes a Galvanometer scanner, and the pulse picker includes an acousto-optic modulator (AOM) or an electro-optic modulator (EOM).

6. A pulse laser machining apparatus according to claim 1, wherein movement of the stage is controlled in the direction perpendicular to the one-dimensional direction on the basis of a scan position signal of the laser beam scanner.

7. A pulse laser machining method comprising:
mounting an object to be machined on a stage;
generating a clock signal;
emitting a pulse laser beam in synchronization with the clock signal;
scanning the pulse laser beam onto a surface of the object to be machined by a laser beam scanner in synchronization with the clock signal in a one-dimensional direction while the stage is in a stationary state;
generating a scan angle detected signal by monitoring a scan angle of the laser beam scanner with a rotary encoder;
starting movement of the stage in a direction perpendicular to the one-dimensional direction after scanning the pulse laser beam in the one-dimensional direction by judging an end of the scanning by a value of the scan angle detected signal;

further scanning the pulse laser beam in the one-dimensional direction in synchronization with the clock signal after movement of the stage ceases; and correcting a machining origin point position for each scan on the basis of the scan angle detected signal, the correcting comprising controlling pass/cutoff of the pulse laser beam in the pulse picker on the basis of the scan angle detected signal, wherein when the pulse laser beam is scanned in the one-dimensional direction, irradiation/non-irradiation of the pulse laser beam is switched in synchronization with the clock signal on the basis of the number of light pulses of the pulse laser beam.

* * * * *